(12) United States Patent
Trinh

(10) Patent No.: US 6,822,743 B2
(45) Date of Patent: Nov. 23, 2004

(54) INTEGRATED-OPTIC CHANNEL MONITORING

(76) Inventor: Paul Trinh, 10690 Bruns Dr., Tustin, CA (US) 92782

( * ) Notice: Subject to any disclaimer, the term of this patent is extended or adjusted under 35 U.S.C. 154(b) by 200 days.

(21) Appl. No.: 10/093,884

(22) Filed: Mar. 7, 2002

(65) Prior Publication Data
US 2002/0149780 A1 Oct. 17, 2002

Related U.S. Application Data
(60) Provisional application No. 60/274,134, filed on Mar. 7, 2001.

(51) Int. Cl.[7] .............................................. G01B 9/02
(52) U.S. Cl. ..................... 356/451; 356/477; 356/450
(58) Field of Search ............................... 356/451, 477, 356/450

(56) References Cited

U.S. PATENT DOCUMENTS

| | | | | |
|---|---|---|---|---|
| 4,632,551 A | * | 12/1986 | Pavlath | 356/478 |
| 5,267,336 A | * | 11/1993 | Sriram et al. | 385/2 |
| 5,359,412 A | * | 10/1994 | Schulz | 356/478 |
| 5,361,383 A | * | 11/1994 | Chang et al. | 385/27 |
| 6,558,585 B1 | * | 5/2003 | Zhang et al. | 264/1.27 |
| 2002/0015155 A1 | * | 2/2002 | Pechstedt et al. | 356/477 |

* cited by examiner

Primary Examiner—Frank G. Font
Assistant Examiner—Andrew H. Lee
(74) Attorney, Agent, or Firm—Stradling Yocca Carlson & Rauth

(57) ABSTRACT

A device for measuring wavelength of an electromagnetic signal has first and second waveguides configured such that a portion of an electromagnetic signal transmitted through the first waveguide is separated from the remaining portion of the electromagnetic signal and is communicated to the second waveguide and is subsequently at least partially recombined with the remaining electromagnetic signal in the first waveguide after traveling a distance which is different from a distance traveled by the remaining electromagnetic signal in the first waveguide. A first sensor is configured to measure the power of the electromagnetic signal in the first waveguide after at least a portion of the separated electromagnetic signal in the first waveguide has been recombined with the remaining electromagnetic signal in the first waveguide. A second sensor is configured to measure the power of the electromagnetic signal in the second waveguide after at least a portion of the separated electromagnetic signal in the second waveguide has been recombined with the remaining electromagnetic signal in the first waveguide. The first and second waveguides are formed upon and integrally with a common semiconductor substrate.

11 Claims, 9 Drawing Sheets

FIG. 10
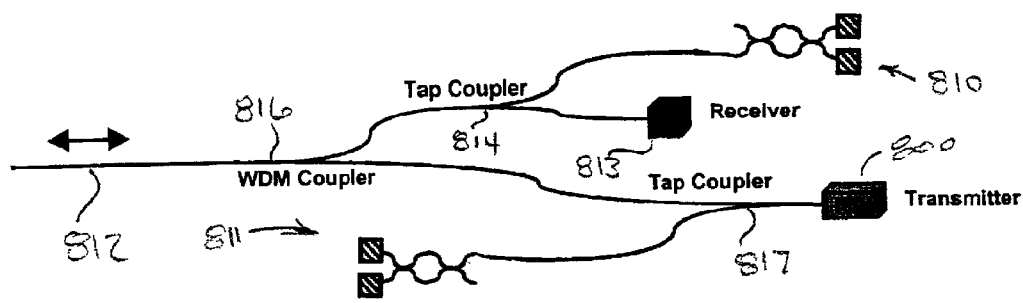
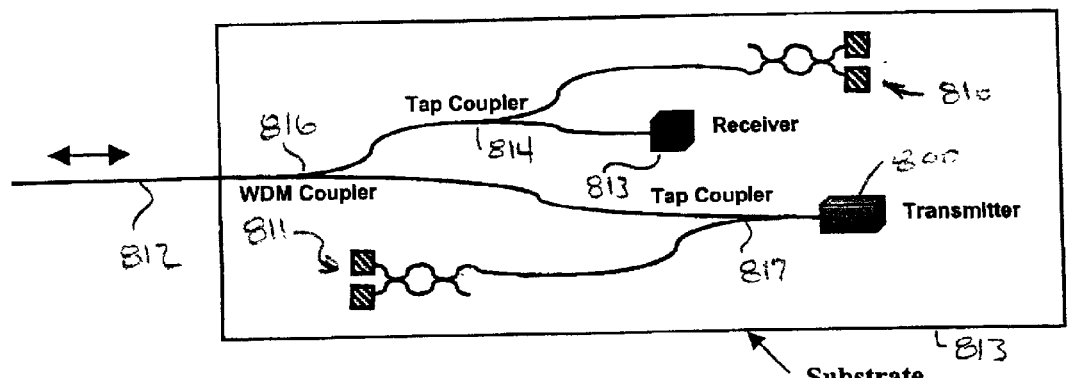
FIG. 11

INTEGRATED-OPTIC CHANNEL MONITORING

PRIORITY CLAIM

This patent application claims the benefit of the priority date of U.S. Provisional Patent Application Ser. No. 60/274,134, filed on Mar. 7, 2001, and entitled INTEGRATED-OPTIC CHANNEL MONITORING, the entire contents of which are hereby expressly incorporated by reference.

FIELD OF THE INVENTION

The present invention relates generally to optical communications. The present invention relates more particularly to a method and apparatus for measuring the wavelength and power of individual channels in dense wavelength division multiplexing (DWDM) optical communications systems and the like.

BACKGROUND OF THE INVENTION

The use of dense wavelength division multiplexing (DWDM) in optical communications systems, such as those using fiber optics, is well-known. According to dense wavelength division multiplexing, a plurality of different wavelengths of light are transmitted via a single medium, such as an optical fiber, simultaneously, so as to substantially enhance communications bandwidth. In this manner, a much greater amount of information may be transmitted than is possible using a single wavelength multiplexing optical communications system.

It is beneficial to monitor the wavelength and power of each separate channel utilized in a wavelength division multiplexing communications system. Monitoring the wavelength and power assures that these parameters are within optimal operating ranges, so as to facilitate the maintenance of reliable communications at approximately maximum bandwidth.

As those skilled in the art will appreciate, when the wavelength of a communications channel drifts away from its nominal center frequency, then that channel will be less efficiently detected by a receiver at the nominal filter passband. Further, as the wavelength of a given channel drifts away from its nominal center frequency, that channel may tend to interfere with other channels, particularly those other channels at adjacent or nearby wavelengths, and cause crosstalk. Therefore, it is desirable to monitor the wavelength of each communications channel in a wavelength division multiplexing communications system, so as to facilitate maintaining the wavelength of the channel as close as possible to its nominal center frequency.

Similarly, as the power of a channel drifts away from its nominal value, the ability to detect the information content of the channel can be substantially degraded. For example, substantially reduced power may place the channel below the threshold at which it may be reliably detected. Conversely, power which is too high may result in saturation of a receiver's detectors. As such, power must remain within the dynamic range of a receiver's detector in order for a channel to be reliably detected. Therefore, it is desirable to monitor the power of each channel in a wavelength division multiplexing communications system, so as to facilitate maintaining the power of the channel as close as possible to its nominal value.

It is known to use devices such as optical spectral analyzers and multi-channel optical wavelength meters to monitor the wavelength of a channel in a wavelength division multiplexing communications system. However, as those skilled in the art will appreciate, both optical spectral analyzers and multi-channel optical wavelength meters suffer from inherent disadvantages which detract from their suitability and desirability for such use. For example, both optical spectral analyzers and multi-channel optical wavelength meters utilize mechanical scanning mechanisms. Those skilled in the art will appreciate that such mechanical scanning mechanisms tend to respond undesirably slowly to changes in wavelength. Moreover, such slow response makes contemporary optical spectral analyzers and multi-channel optical wavelength meters less suitable for real time monitoring and control of optical communications systems. Furthermore, both optical spectral analyzers and multi-channel optical wavelength meters are comparatively large in size (at least in part due to their use of mechanical scanning mechanisms) and are undesirably expensive to purchase, install and maintain.

It is also known to use phased array waveguide gratings (PAWGs) to effect the measurement of wavelengths in wavelength division multiplexing optical communications systems. Such phased array waveguide gratings utilize a crossover property thereof to monitor the wavelength of individual channels in a wavelength division multiplexing optical communications system. Phased array waveguide gratings do not utilize mechanical scanning mechanisms like those of optical spectral analyzers and multi-channel optical wavelength meters, and therefore tend to be less expensive to purchase, install and maintain, as compared to optical spectral analyzers and multi-channel optical wavelength meters. However, as those skilled in the art will appreciate, phased array waveguide gratings have two passband peaks associated with each channel spacing, thus making the crossover point difficult to control. Further, the wavelength range of a phased array waveguide grating is typically less than 50% of the signal channel spacing, which results in poor performance of the phased array waveguide grating.

In view of the foregoing, it is desirable to provide a method and apparatus for measuring the wavelength of each channel in a wavelength division multiplexed optical communications system, which is comparatively inexpensive to purchase, install and maintain and which provides satisfactory performance. It is further desirable to provide such a system which is additionally capable of measuring the power of each wavelength division multiplexed channel.

SUMMARY OF THE INVENTION

The present invention specifically addresses and alleviates the above-mentioned deficiencies associated with the prior art. More particularly, the present invention comprises a method and device for measuring a wavelength of an electromagnetic signal, wherein first and second waveguides are configured such that a portion of an electromagnetic signal which is transmitted through the first waveguide is separated from a remaining portion of the electromagnetic signal in the first waveguide and is communicated to the second waveguide. A portion of the electromagnetic signal (now in the second waveguide) which was separated from the remaining portion of the electromagnetic signal (still in the first waveguide) is subsequently at least partially recombined with the remaining portion of the electromagnetic signal (in the first waveguide), after the separated portion has traveled a distance which is different from the distance traveled by the remaining portions.

A first sensor is configured to measure the power of the electromagnetic signal in the first waveguide after at least a portion of the separated electromagnetic signal in the second waveguide has been recombined with the remaining electromagnetic signal in the first waveguide.

Similarly, a second sensor is configured to measure the power of the electromagnetic signal in the second waveguide after at least a portion of the separated electromagnetic signal in the second waveguide has been recombined with the remaining electromagnetic signal in the first waveguide.

According to the preferred embodiment of the present invention, the first and second waveguides are formed upon and integrated with a common, i.e., the same, semiconductor substrate.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

These, and other features, aspects and advantages of the present invention will be more fully understood when considered with respect to the following detailed description, appended claims and accompanying drawings, wherein:

FIG. 10 is a schematic diagram showing a fiber-based and waveguide type optical transceiver having bi-directional wavelock and power monitoring, according to the present invention;

FIG. 11 is a schematic diagram showing a waveguide optical chip optical transceiver having bidirectional wavelength and power monitoring according to the present invention;

DETAILED DESCRIPTION OF THE INVENTION

Figure 1:
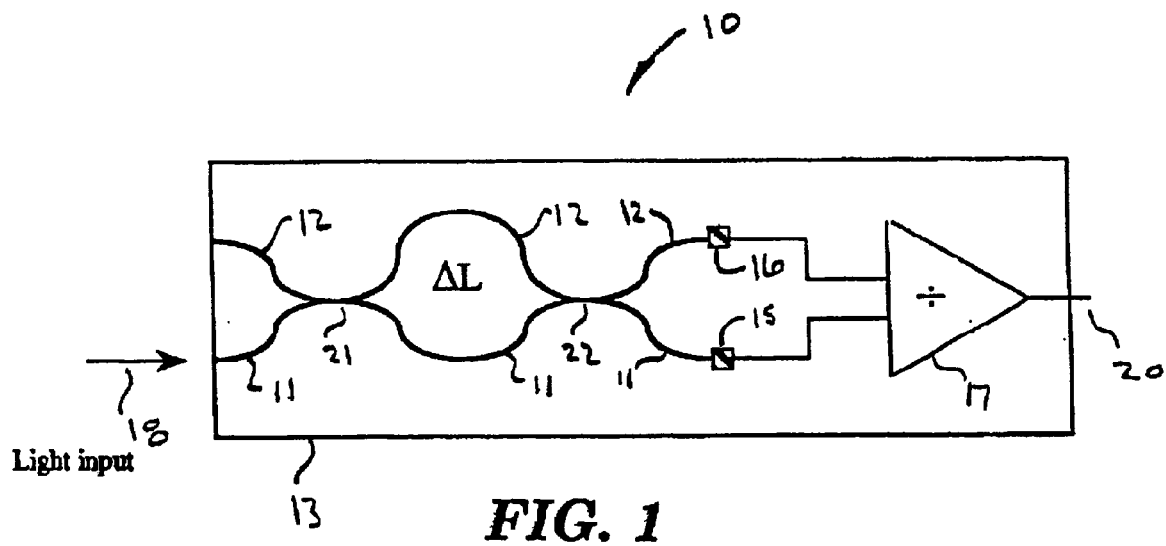
FIG. 1 is a schematic block diagram of a device for measuring the wavelength of electromagnetic radiation according to one aspect of the present invention.

The detailed description set forth below in connection with the appended drawings is intended as a description of the presently preferred embodiments of the invention, and is not intended to represent the only forms in which the present invention may be constructed or utilized. The description sets forth the functions and the sequence of steps for constructing and operating the invention in connection with the illustrated embodiments. It is to be understood, however, that the same or equivalent fuctions may be accomplished by different embodiments that are also intended to be encompassed within the spirit and scope of the invention.

The present invention comprises a device for measuring a wavelength of electromagnetic signals, such as optical signals used for telecommunications. The devices comprises first and second waveguides configured such that a portion of an electromagnetic signal transmitted through the first waveguide is separated from the remaining portion of the electromagnetic signal and is communicated to the second waveguide and is subsequently at least partially recombined with the remaining electromagnetic signal in the first waveguide after traveling a distance which is different from the distance traveled by the remaining electromagnetic signal in the first waveguide.

A first sensor is configured to measure a power of the electromagnetic signal in the first waveguide after at least a portion of the separated electromagnetic signal in the second waveguide has been recombined with the remaining electromagnetic signal in the first waveguide.

Similarly, a second sensor is configured to measure a power of the electromagnetic signal in the second waveguide after at least a portion of the separated electromagnetic signal in the second waveguide has been recombined with the remaining electromagnetic signal in the first waveguide. According to one aspect of the present invention, the first and second waveguides are formed upon and integrally with a common semiconductor substrate.

Formation of the first and second waveguides upon a common semiconductor substrate facilitates miniaturization of the wavelength measuring device of the present invention and provides a method for measuring the wavelength's of electromagnetic radiation which is reliable and comparatively inexpensive to purchase, install and maintain. Such miniaturization facilitates use of a plurality of such devices for the simultaneous measurement of a corresponding plurality of individual channels in a wavelength division multiplexed telecommunication system. Thus, the first and second waveguides may be formed via conventional integrated circuit manufacturing processes such as photoetching, electron milling and laser ablation.

Alternatively, the first and second waveguides may be formed by fusing two optical fibers to one another, so as to form at least two interfaces where electromagnetic energy may be transferred between the two fibers and such that one fiber defines a longer path length than the path length defined by other fiber.

According to one aspect of the present invention, the two waveguides are configured to measure the wavelength of an optical signal, such as an infrared optical signal utilized in wave division multiplexing (WDM) optical communications. Those skilled in the art will appreciate that the present invention is likewise suitable for use in various other applications.

The first and second waveguides preferably comprise a semiconductor material, preferably the same semiconductor material as the substrate. Those skilled in the art will appreciate that various different materials are suitable for the waveguide and the substrate and that various such waveguide materials can be formed upon various such substrate materials which are different from the waveguide materials. Indeed, each of the two waveguides may be formed of a different material with respect to one another, so as to effect different optical path lengths therefore, for example. The two waveguides and the substrate are preferably comprised of silicon, preferably substantially single crystalline silicon. The first and second waveguides are preferably comprised of silicon which is as nearly single crystalline as possible, since discontinuities in the crystalline structure tend to inhibit the communication of electromagnetic radiation through the waveguides.

Thus, according to the preferred embodiment of the present invention, the waveguides preferably comprise substantially single crystalline waveguides formed upon and integrally with a substantially single crystalline substrate.

The first and second waveguides preferably comprise single mode waveguides. The first and second waveguides are preferably generally square in cross-section and each side of the square cross-section preferably has a length of between approximately 3 microns and approximately 4 microns. However, those skilled in the art will appreciate that various other cross-sectional configurations and dimensions of the waveguide are likewise suitable and that the dimensions of the waveguides will depend, at least in part, upon the nominal wavelength of the electromagnetic radiation being measured.

The first and second waveguides preferably define a Mach Zehnder configuration, wherein the first and second waveguides are closest where the electromagnetic signal transmitted through the first waveguide is separated and also where the separated electromagnetic signal is at least partially recombined. The distance between the first and second waveguides where the electromagnetic signal is separated and where the electromagnetic signal is at least partially recombined is preferably approximately 2 microns. However, those skilled in the art will appreciate that various other distances between first and second waveguides are likewise suitable and that the distance will depend, at least in part, upon the normal wavelength of the electromagnetic radiation being measured.

As used herein, the term Mach Zehnder refers to a pair of waveguides configured to separate electromagnetic radiation into two portions and subsequently at least partially recombine the separated portions, after the two portions have traveled different effective optical distances, and then once more separate the recombined electromagnetic radiation in two portions (which may be different from the two originally separated portions), so as to facilitate measurement of a wavelength of the electromagnetic radiation.

Preferably, the substrate comprises a first substrate layer (upon which the waveguides are formed) comprised of substantially single crystalline silicon and a second substrate layer comprised of either single crystalline silicon or polycrystalline silicon. An insulting layer, preferably comprised of silicone dioxide, is preferably disposed generally intermediate the first and second layers. The insulating layer is preferably formed close enough to the waveguides so as to inhibit substantial leakage of electromagnetic radiation from the waveguides. The waveguide are generally formed of the same material as the first substrate layer, and may indeed be formed therefrom according to contemporary photolighographic methodologies. The primary purpose of the second substrate layer is to provide mechanical support for the first substrate layer. The first substrate layer will typically be much thinner than the second substrate layer.

As mentioned above, the substrate and/or the two waveguides may be comprised of various other materials. For example, the substrate and/or the waveguides may alternatively be comprised of lithium niobate (LiNbO3) or indium phosphate (InP).

According to the preferred embodiment of the present invention, the sensor comprises a photodetector. However, those skilled in the art will appreciate that various other types of transducers are likewise suitable for sensing the power or intensity of the electromagnetic signal communicated through the first and second waveguides. Further, those skilled in the art will appreciate that although it is generally desirable to measure the power of the electromagnetic signals communicated through the first and second waveguides, the intensity of the electromagnetic signals may alternatively be determined and the power then determined from the intensity.

According to one alternative embodiment of the present invention, an optical path length adjuster is configured to change the effective optical path length of the first and/or second paths. Optionally, a first optical path length adjuster is configured to change the effective optical path length of both the first and second paths together and a second optical path length adjuster is configured to change the effective optical path length of only one of the first and second paths.

The optical path length adjuster may be configured to change the effective optical path length of the first and/or second paths by varying the physical length thereof and/or by varying an index of refraction of at least a portion thereof.

The optical path length adjuster may, for example, be configured to change the physical length of the first and/or second paths by utilizing thermal expansion, such as that caused by an electrical resistive element (a heating element), so as to change a physical length thereof. The index of refraction of a portion of the first and/or second paths may be changed by changing the temperature thereof, such as via the use of an electrical resistance element (a heating element). Indeed, a heating element may be used to changed both the physical length and index of refraction of the first and/or second paths.

Alternatively, the effective optical path length adjuster may be comprised of a material having an electrically variable index of refraction.

The present invention preferably further comprises a circuit configured to use outputs of the first and second sensors to determine a wavelength of the electromagnetic signal. Optionally, the present invention further comprises a circuit configured to use outputs of the first and second sensors to determine a power of the electromagnetic signal, as well. Those skilled in the art will appreciate that one or more pairs of waveguides may be formed upon a common substrate and that the sensor(s), e.g., photodector(s), and the circuitry which uses the outputs of the sensor(s) to determine wavelength may be disposed either upon the common substrate or separate therefrom. Thus, the first and second paths, defined by first and second waves guides, may be formed upon the common substrate so as to define an assembly similar to an integrated circuit chip. Those skilled in the art will appreciate that the present invention may be packaged in a variety of different ways, so as to define some different aspects of the present invention.

Optionally, the sensors, the logarithmic ratio amplifiers, and/or any other desired circuitry may be included upon the same substrate as the two wave guides, so as to define an integrated circuit chip. Further, a demultiplexor, analog to digital converter, and/or signal processor (either including or not including a lookup cable), as described in more detail below, may similarly be formed upon the same substrate as the two waveguides, so as to define an integrated circuit chip.

According to one aspect of the present invention, a logarithmic ratio amplifier is coupled so as to receive outputs of the first and second sensors. The logarithmic ratio amplifier provides an output which is proportional to the ratio of the outputs of the first and second sensors. A lookup table or the like may then be used to provide a wavelength of the electromagnetic signal, wherein the wavelength corresponds to the output of the logarithmic ratio amplifier. That is, for each output of the logarithmic ratio amplifier, there is generally one unique wavelength which correspondence thereto. An analog-to-digital converter may optionally be utilized to convert the analog output of the logarithmic ratio amplifier into a digital signal representative thereof, so as to facilitate use of the lookup table. Thus, the digital value representative of the output of the logarithmic ratio amplifier may be used to find a corresponding digital wavelength value in the lookup table, according to well known principles.

According to one aspect of the present invention, the first and second waveguides, the first and second sensors, the logarithmic ratio amplifiers, the analog-to-digital converter and the lookup table are all formed upon a common substrate, so as to at least partially define an integrated circuit chip.

Optionally, a summing circuit is utilized for summing the outputs of the first and second sensors, so as to facilitate the determination of the power of the electromagnetic signal. The summing circuit may operate directly upon the analog outputs of the sensors or may alternatively operate upon digital signals representative thereof (such from an analog to digital converter).

According to one aspect of the present invention, a demultiplexor is configured to receive an infrared optical input signal having a plurality of components. Each component of the infrared optical signal has a different wavelength. The demultiplexor is configured to provide a plurality of single component output signals, wherein each single component output signal corresponds to one component of the composite infrared optical signal which is input to the demultiplexor. A plurality of Mach Zehnder waveguide assemblies are each preferably coupled so as to receive a dedicated one of the single component output signals of the demultiplexor.

Each Mach Zehnder waveguide assembly preferably comprises a substrate comprised of a first substrate layer comprised of substantially single crystalline silicon and a second substrate layer comprised of either single crystalline silicon or polycrystalline silicon. An insulating layer comprised of silicon dioxide is preferably disposed generally intermediate the first and second substrate layers.

First and second waveguides are formed upon the first substrate layer to define the first and second paths. The first and second waveguides are preferably comprised of substantially single crystalline silicon and are preferably formed generally integrally with the first substrate. The first and second waveguides cooperate so as to define a Mach Zehnder configuration. The Mach Zehnder configuration has a splitter and a recombiner/splitter. The first and second waveguides have different lengths. Preferably, a first optical path length adjuster is configured to adjust an optical path of both the first and second waveguides together. Additionally, a second optical path length adjuster is configured to adjust an effective optical path of only one of the first and second waveguides.

The sensors define a plurality of sensor pairs, wherein each sensor pair comprises two individual sensors, each of which provides an analog output which is proportional to the power of an infrared signal incident thereon. Each sensor pair is coupled to receive two optical outputs of one of the Mach Zehnder waveguide assemblies. A logarithmic ratio amplifier is preferably coupled so as to receive the analog electrical outputs from both of the sensors of each sensor pair. Each logarithmic ratio amplifier provides an analog electrical output which is proportional to a logarithm of the ratio of the analog electrical outputs from the two sensors.

Accordingly to one aspect of the present invention, an analog to digital converter is coupled so as to receive an output of each logarithmic ratio amplifier and to provide a digital output representative thereof. A signal processor is coupled so as to receive the digital output of the analog-to-digital converter. The signal processor comprises a lookup table for associating a wavelength with the digital output of each Mach Zehnder waveguide assembly. The demultiplexor, the Mach Zehnder waveguide assemblies, the sensor pairs, the logarithmic ratio amplifiers, the analog-to-digital converter and the signal processor are all preferably formed upon a common substrate so as to define a single, integrated circuit chip.

The device for measuring a wavelength of an electromagnetic signal is illustrated in FIGS. 1 through 5, which depict presently preferred embodiments thereof. The illustrated embodiments and their accompanying description disclose a method and device for measuring the wavelength of infrared electromagnetic radiation.

The description of a method and device for measuring infrared electromagnetic radiation is by way of example only, and not by way of limitation. There skilled in the art will appreciate that the present invention is suitable for measuring various different types of electromagnetic radiation in various different applications. For example, the method and device of the present invention may be utilized to measure the wavelength and/or power of usable light Referring now to FIG. 1, first 11 and second 12, waveguides are formed upon the same, i.e., a common, substrate 13. The first waveguide 11, the second waveguide 12 and the substrate 13 are all preferably comprised of single crystalline silicon. Alternatively, the first waveguide 11, the second waveguide 12 and the substrate, or any condition thereof, may be formed of lithium niobate, indium phosphate or any other material or combination of materials which is suitable for the transmission of infrared electromagnetic signals.

Single crystalline silicon, lithium niobate, and indium phosphate are materials suitable for the transmission of infrared optical electromagnetic signals. Those skilled in the art will appreciate that various other materials are similarly suitable for the transmission of various other types of electromagnetic radiation and may therefore be utilized when the present invention is intended for the measurement of the wavelength and/or power of such other types of electromagnetic radiation.

The length of the first path defined by the first waveguide 11 is different from the length of a second path defined by the second waveguide 12. The path length difference is related to the range of wavelengths which the present invention is suitable for measuring. The relationship between the path length difference and the range of wavelengths for which the present invention is suitable is represented by the following relationship:

$$\Delta\lambda = \lambda_1 \lambda_2 / 2n\Delta L$$

where $\Delta\lambda$ is the range of wavelengths for which measurement via the present invention is suitable, $\lambda_1$ is the shortest wavelength of the range of wavelengths, $\lambda_2$ is the longest wavelength of the range of wavelengths, "n" is the refractive index of the material from which the first and second paths are formed, and $\Delta L$ is the difference in length between the first and second paths. For example, in order to obtain a measurement range from 1,510 nanometers to 1,560 nanometers, a path length difference of approximately 12 microns is required.

Each of the first 11 and second 12 waveguides of the integrated-optic channel monitoring circuit of the present invention is preferably configured as a single mode optical waveguide and is preferably square in cross-sectional configuration. Each side of the square is preferably between approximately 2 microns and approximately 4 microns in length. Those skilled in the art will appreciate that the dimensions of the waveguide depend upon the nominal center frequency of the electromagnetic signal being measured and will also depend upon the materials which the waveguides are formed.

Alternatively, the first 11 and second 12 waveguides of the integrated-optic channel monitoring circuit of the present invention are configured as dual mode or multi-mode optical waveguides and are rectangular in configuration or are defined by some other polygon, preferably having parallel sides in cross-sectional configuration.

The first 11 and second 12 waveguides are preferably configured so as to define a single Mach Zehnder assembly. A plurality of such Mach Zehnder waveguides may be formed upon the same substrate to facilitate the generally simultaneous measurement of a corresponding plurality of separate electromagnetic signals, such as channels of a wavelength division multiplexed communications signal. Where the first 11 and second 12 waveguides are closest to one another, i.e., at the separator and at the separator/recombiner, the first and second waveguides are spaced approximately 2 microns apart. Those skilled in the art will appreciate that the distance between the first and second waveguides where the first and second waveguides are closest to one another, will depend, at least in part, upon the frequency of the electromagnetic signal being measured.

The substrate upon which the first 11 and second 12 waveguides are formed preferably comprises a first substrate layer comprising single crystalline silicon (from which the first 11 and second 12 waveguides are also preferably formed), a second substrate layer comprising either single crystalline silicone or polysilicon, and an insulating layer comprising silicon dioxide disposed generally intermediate the first and second layers. Those skilled in the art will appreciate that a variety of different materials may likewise be utilized for the second substrate layer. The primary purpose of the second substrate layer is merely to provide mechanical support for the first substrate layer, without introducing undesirable electrical properties, such as excessive capacitance.

The first substrate layer, second substrate layer, and insulating layer may be formed by a variety of different processes. For example, the first substrate layer, second substrate layer, and the silicone dioxide layer may be formed utilizing a bond and etchback (BESOI) process. Alternatively, the first substrate layer, second substrate layer, and silicone dioxide layer may be formed utilizing a separation by implantation of oxygen process (SINOX). As a further alternative, the first substrate layer, second substrate layer, and the silicon dioxide layer may be formed utilizing a SmartCut® process. These processes are all well-known in the art of semi-conductor fabrication.

The substrate 13 is preferably formed according to contemporary integrated circuit fabrication methodology, such that electrical components such as photodetectors, amplifiers, an analog-to-digital converter and a signal processor may be formed thereon according to such contemporary methodologies.

First photodetector 15 is preferably formed at a termination of the first path, defined by first for waveguide 11. Similarly, second photodetector 16 is preferably formed at a termination of the second path, defined by second waveguide 12. The first 15 and second 16 photodetectors may be formed upon the substrate according to contemporary integrated circuit fabrication methodologies.

The first 15 and second 16 photodetectors sense the power of electromagnetic signals communicated from the first 11 and second 12 waveguides, respectively. The first 15 and second 16 photodetectors define a pair of photodetectors associated with the first 11 and second 12 waveguides of a single Mach-Zehnder assembly. The outputs of the first 15 and second 16 photodetectors are provided to logarithmic ratio amplifier 17. Logarithmic ratio amplifier 17 is preferably a differential amplifier which provides an output that is proportional to the difference between the first 15 and second 16 detector outputs and which is logarithmic with respect to this difference. Those skilled in the arts will appreciate that various other methods and devices for comparing the outputs of the first 15 and second 16 photodetectors are likewise suitable. For example, the first 15 and second 16 photodetectors may be configured such that the outputs thereof are opposite in polarity, such that when the two outputs are combined, a difference therebetween inherently results.

Comparison of the outputs of the first 15 and second 16 photodetectors may occur in an electronic component such as the logarithmic amplifier 17, which is discussed above. Alternatively, the outputs of the first 15 and second 16 photodetectors may be digitized and then the digitized values may be compared numerically, such as via a microprocessor.

According to the present invention, a light input 18 defines the electromagnetic signal for which wavelength measurement is desired. This light input 18 may comprise, for example, an infrared optical signal such as those commonly used in wavelength division multiplexed (WDM) or dense wavelength division multiplexed (DWDM) communications systems. A plurality of separate wavelength measuring devices can be used to facilitate the measurement a corresponding plurality of different channels in such a wave division multiplexed communications systems. Each wavelength measuring device may be formed upon either a common substrate or upon a separate substrate, with respect to the other wavelength measuring devices.

The light input 18 enters the first path defined by waveguide 11 and is transmitted, at least in part, to the first detector 15. The first 11 and second 12 waveguides define a separator 21 and a separator/combiner 22, where the first 11 and second 12 waveguides are closest to one another. At the separator 21, a portion of the electromagnetic signal transmitted through the first waveguide 11 is separated from the remaining portion of the electromagnetic signal in the first waveguide 11 and is communicated to the second waveguide 12. The portion of the electromagnetic signal which was separated from the remaining portion of the electromagnetic signal in the first waveguide 11 travels through the second waveguide 12 to the combiner/separator 22, where it is recombined, at least in part, with the remaining signal in the first waveguide 11.

When the signal remaining in the waveguide 11 is recombined with the signal which was separated therefrom and which traveled through the second waveguide 12, interference occurs. When the interfering signals in the first 11 and second 12 waveguides are separated by the recombiner/separator 22, then that portion of the electromagnetic signal which remains in the first waveguide 11 is communicated to the first photodetector 15 and that portion of the electromagnetic signal which remains in the second waveguide 12 is communicated to the second photodetector 16.

Interference occurs at the recombiner/separator 22 because the length of the first path defined by the first waveguide 11 is different from the length of the second path defined by the second wave guide 12, at least for that portion of the first and second paths which is intermediate the separator 21 and the separator/recombiner 22. Thus, the electromagnetic signals arriving at the recombiner/separator 22 from the first waveguide 11 and the second waveguide 12 may be out of phase with respect to one another. The amount by which these signals are out of phase is determined at least in part, by the wavelengths of the light input 18. Moreover, the amount of interference which occurs at the separator/combiner 22 is determined by the difference in the length of the paths defined by the first 11 and second 12 waveguides, by the materials of which the first 11 and second 12 waveguides are comprised, and by the wavelength of the electromagnetic radiation being measured according to well-known principles.

As those skilled in the art will appreciate, the power of the electromagnetic radiation which continues to be communicated through the first waveguide 11 (and which is consequently measured by the first photodetectors 15), is determined, to a substantial degree, by the amount of interference which occurs between the electromagnetic radiation which remained within the first waveguide 11 after a portion thereof was separated therefrom by the separator 21 and the electromagnetic radiation which was separated from the first waveguide 11 and which was communicated through the second waveguide 12. As those skilled in the art will appreciate, although such interference may vary the power sensed by the first sensor 15, such interference does not alter the total power of the electromagnetic signals communicated through the first 11 and second 12 waveguides. Rather, such interference merely affects distribution of the power between the first 11 and second 12 waveguides, thereby determining the ratio thereof. Thus, the wavelength of the electromagnetic radiation communicated through the first 11 and second 12 waveguides can be determined by determining the ratio of the power of the electromagnetic radiation communicated via the first 11 and second 12 waveguides. As those skilled in the art will appreciate, this ratio will uniquely define the wavelength of the light input 18 over a given range of wavelengths as defined by the formula given above. Outside of this range of wavelengths, the ratios will repeat indefinitely, so as to give aliased or improper values. Therefore, it is important that wavelength of the light input 18 be within the range for wavelengths which the present invention was constructed, as determined, in at least in part, by the difference in path lengths ΔL.

Since the total power of the light input 18 is not substantially affected by the first 11 and second 12 waveguides and their interactions with one another, the total power can easily be determined by adding together the power detected by the first 15 and second 16 detectors. That is, although the first 11 and second 12 waveguides may split the power of light input 18 among themselves, the total power is not effected appreciably thereby.

Figure 2:
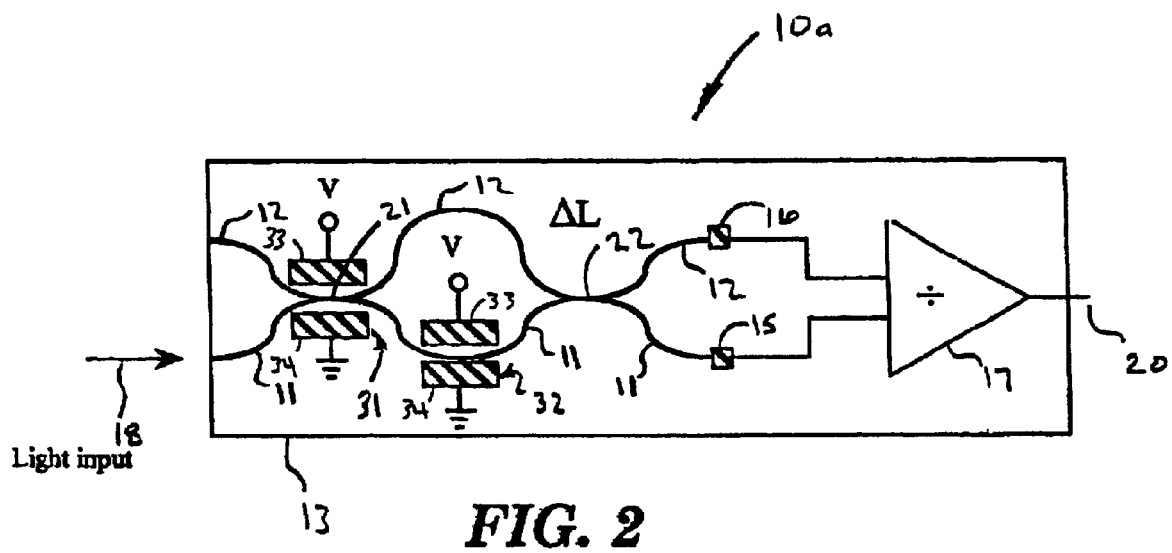
FIG. 2 is a schematic block diagram of the device of FIG. 1, additionally showing one optical path length varying device configured to vary the lengths of the first and second paths simultaneously and another optical path length varying device configured to vary the length of only one of the paths (and thus vary the difference, $\Delta L$, in path lengths), according to another aspect of the present invention.

Referring now to FIG. 2, according to an alternative embodiment of the present invention, first 31 and second 32, optical path length adjusters may be utilized to vary the effective optical path length of the first 11 and/or second 12 waveguides. The path length of the first 11 and/or second 12 waveguides may be varied so as to facilitate the calibration of the wavelength measuring device of the present invention, as discussed in detail below.

The path lengths of the first 11 and second 12 waveguides may also be varied so as to change the range of wavelengths which may be measured by the wave measuring device of the present invention. As determined by the formula given above, a change in the difference in path length ΔL between the first path and the second path results in an inversely proportional change in the range of wavelengths which may be measured by the present invention.

Each of the first 31 and second 32 optical path length adjusters may be comprised of first 33 and second 34 electrodes, which are configured such that varying a bias voltage applied to the first electrode 33 thereof effects a change in the optical path length of at least that portion of the first 11 and/or second 12 waveguides disposed intermediate the first 33 and second 34 electrodes. Thus, by adjusting the voltage applied to the first electrode 33 of either the first 31 or second 32 optical path length adjuster, the distribution or ratio of optical energy in the first 11 and second 12 waveguides may be approximately equalized, so as to generally zero the output of the logarithmic ratio amplifier 17. In this manner, wavelength measuring device 10 may be calibrated so as to provide zero output when the wavelength of the light input 18 is at a desired value and to provide a negative or positive output when the wavelength of the light input 18 is different from the desired value.

As those having skill in the art will appreciate, the first 31 and second 32 optical path length adjusters may comprise any desired electrical component or material which facilitates electrical control of the path length of the first 11 and second 12 waveguides. Thus, the first 31 and second 32 optical path length adjusters may comprise heaters which vary lengths of at least a portion of the first 11 and second 12 waveguides. Such heaters may also vary an index of refraction of the first 11 and/or second 12 waveguides, so as vary the optical path length thereof. Alternatively, the first 31 and second 32 optical path length adjusters may electrically alter the index of refraction of the first 11 and/or second 12 waveguides without applying substantial heat thereto.

Figure 3:
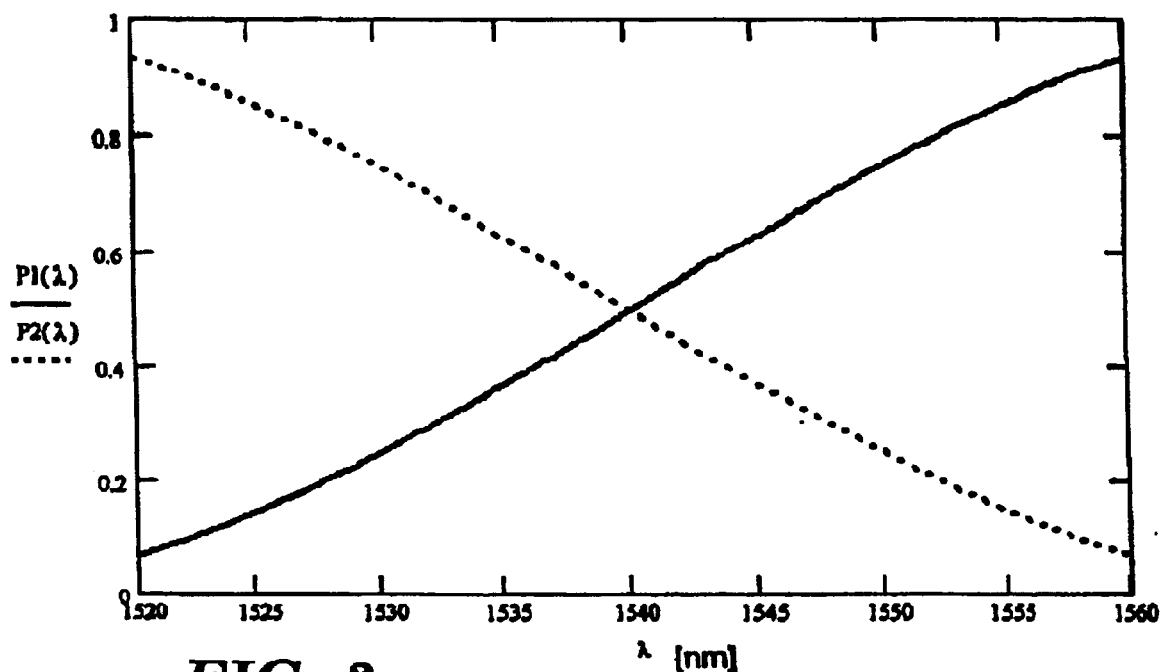
FIG. 3 is a graph showing how the outputs of the first and second photodetectors vary for different wavelengths of the electromagnetic radiation, i.e., infrared radiation, being measured.

Referring now to FIG. 3, a graph showing the outputs of the first 15 and second 16 photodetectors is shown. As can be seen from this graph, the total power always remains the same (the total power is merely the sum of the power of the first 15 and second 16 photodetectors, i.e., is merely the sum of P1 ($\lambda$) and P2 ($\lambda$)). Thus, as the power of the second photodetector (dotted line) declines in value, the power of the first photodetector (solid line) increases correspondingly. As such, the total power of the light input 18 provided to the wavelength measuring device may be determined by simply summing the outputs of the first 15 and second 16 photodetectors.

Figure 4:
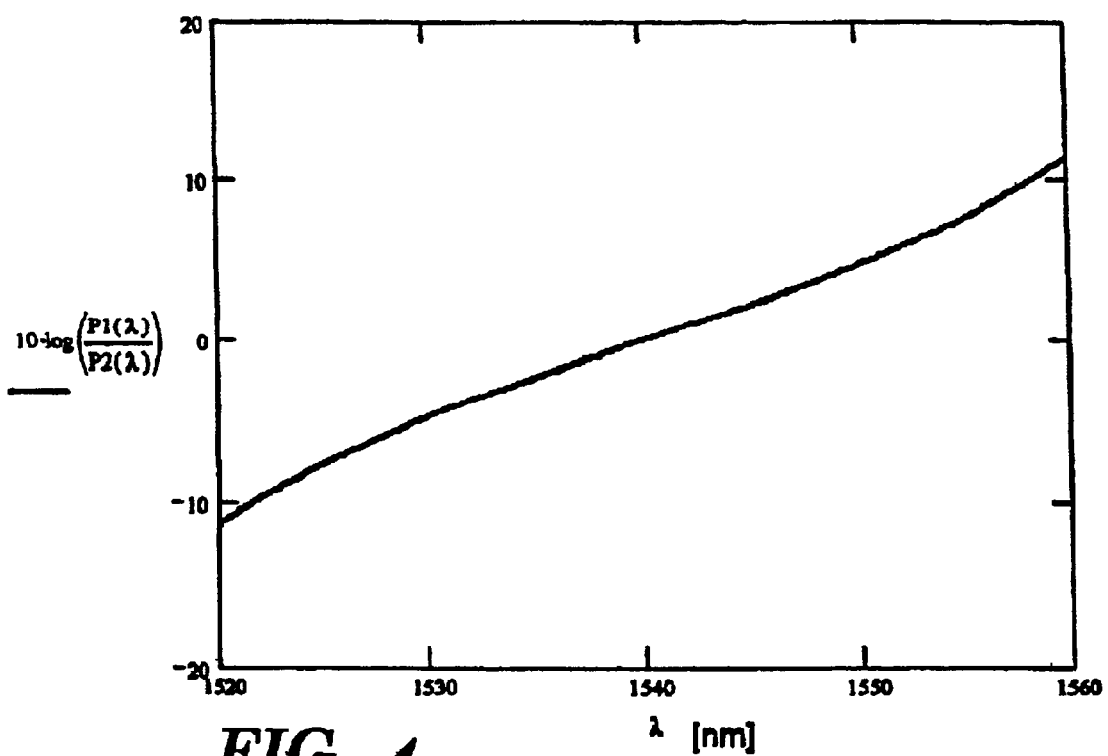
FIG. 4 is a graph showing how the logarithm of the ratio of the outputs of the first and second photodetectors varies for different wavelength measurements.

Referring now to FIG. 4, a graph showing the unique curve defined by the logarithm of the ratio of the output of the first photodetector 15 to the output of the second photodetector 16 is provided. The discrete values associated with the ratios and their corresponding wavelengths shown in FIG. 4 may, if desired, be incorporated into a lookup table such that the wavelength may be determined by simply using the logarithm of the ratio of the outputs of the first 15 and second 16 photodetectors to look up the correspondence wavelength in the lookup table. Those skilled in the art will appropriate that other methods may be utilized to determine the wavelength of the light input 18. For example, a non-discreet or analog circuit may be defined wherein an input representative of the logarithm of the ratio of the outputs of the two detectors will result in a single output thereof which is representative of the wavelength of the value for 18.

Indeed, in some instances it may not be necessary that a value for the measured wavelength be provided. For example, the output of the logarithmic ratio amplifier 17 may be utilized in a closed loop control system or the like, so as to maintain the wavelength of the light input 18 at a desired value (such as the value which results in zero output of the logarithmic ratio amplifier 17). Such a closed loop control system may optimally include digital components, such as wherein a digital value representative of the difference between the desired wavelength and the natural wavelength of the light input 18 is digitally transmitted to the source (an optical communications transmitted, for example) of the light input 18, so as to effect a change in the output thereof.

Figure 5:
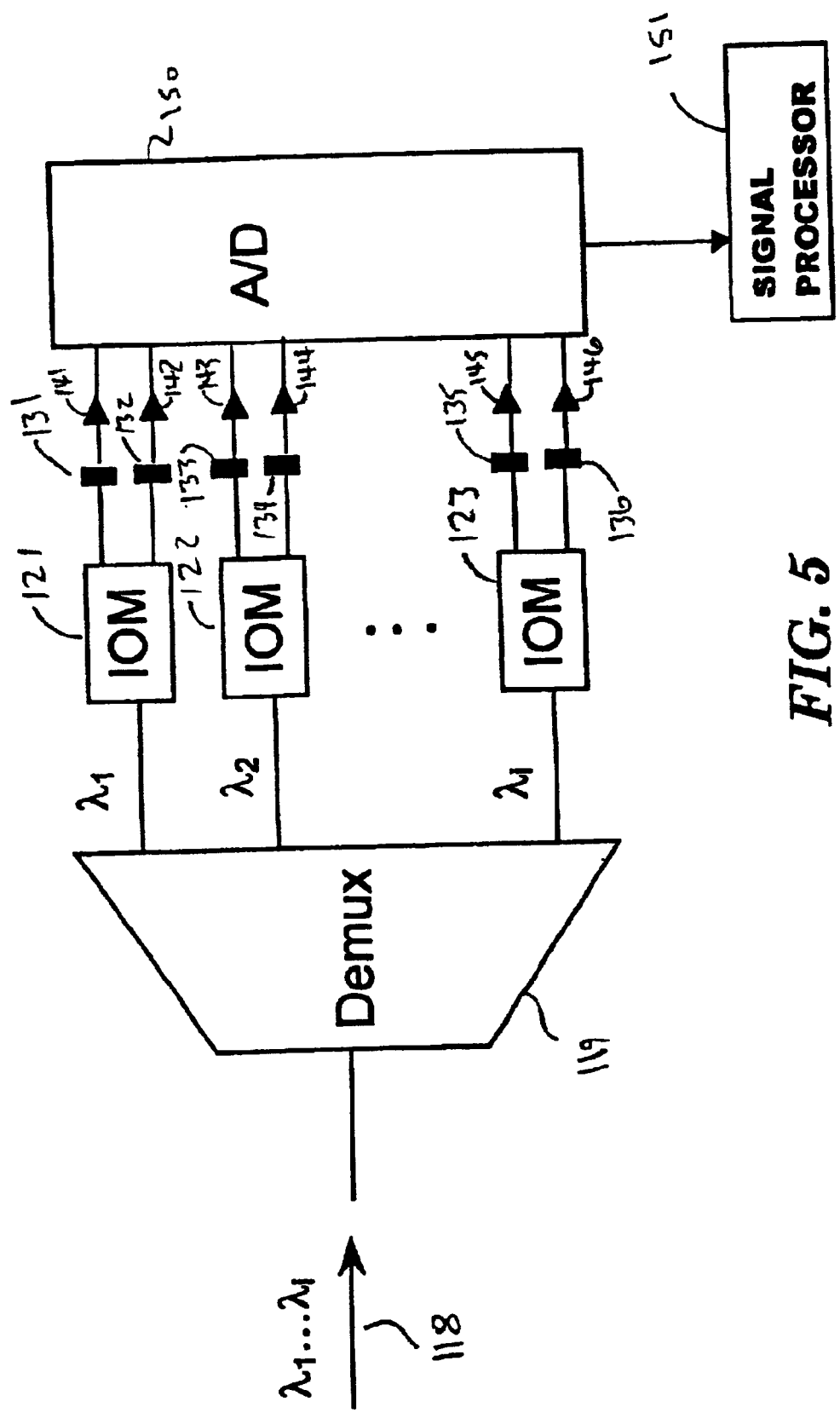
FIG. 5 is a schematic block diagram showing a plurality of integrated-optic channel monitors (IOMs) configured to receive the output of a demultiplexor and configured to provide dual outputs to a plurality of photodetectors, according to another aspect of the present invention.

Referring now to FIG. 5, an integrated optical channel power and wavelength monitoring system is shown. A plurality of individual devices for measuring the wavelengths and powers of a composite electromagnetic signal are utilized, so as to determine the wavelength and power of each channel of the composite wavelength division multiplexed (WDM) or dense wavelength division multiplexed (DWDM) optical signal. The composite or multi-channel light input 118 comprises a plurality of different wavelengths of light, such as a plurality of wavelengths of infrared light. A demultiplexor 119 separates the composite light input into separate channels, wherein channel has a wavelength ($\lambda_1, \lambda_2 \ldots \lambda_i$) which is generally approximately equal to its preassigned or nominal value. Demultiplexor 119 provides a separate channel to each integrated-optic channel monitor (IOM) 121–123.

Each integrated-optic channel monitor 121–123 comprises first and second waveguides, such as those shown in FIGS. 1 and 2. Optional optical path length adjusters such as 31 and 32 of FIG. 2 may be utilized, if desired. Each integrated-optic channel monitor 121–123 has two outputs, each of which provide electromagnetic radiation to one of a pair of photodetectors 131–136.

Each pair of photodetectors (which are associated with a particular integrated-optic channel monitor 121–123) may provide an output to a single logarithmic ratio amplifier, such as 17 of FIGS. 1 and 2. Alternatively, each individual photodetector 131–136 may provide an output to one amplifier 141–146. Thus, the photodetectors 131–136 may either output to individual separate amplifiers 141–146 as shown in FIG. 5 or may output in pairs to differential amplifiers such as 17 of FIGS. 1 and 2.

Those skill in the art will appreciate amplifiers 141–146 (or of differential amplifiers 17, if used) may be omitted if the analog-to-digital converter 150 is capable of directly receiving the outputs of the photodetectors 131–136. The outputs of the amplifiers 141–146 may then be provided to an analog-to-digital converter 150, which converts the analog outputs thereof into corresponding digital values. The outputs of each pair of photodetectors (such as 141 and 142) which are associated with a particular integrated-optic channel (such as 121) may then be utilized to calculate a sum (for power) or ratio (for wavelength) thereof. A sum may be calculated using the digital values associated with the outputs of the amplifiers 141–146 so as to determine a power of the individual channel ($\lambda_1$–$\lambda_i$). In a similar fashion, a ratio may be formed used utilizing the digital values corresponding to the outputs of the amplifiers 141–146, so as to determine a wavelength of the individual channel ($\lambda_1$–$\lambda_i$). Such sums and ratios may be formed via signal processor 151. In this manner, the need for logarithmic deferential amplifiers 17 is mitigated. If the amplifiers 141 provide a logarithmic output, then this ratio may be formed by simply subtracting one of the photodetector's (such as 141) outputs from the other photodetector (such as 142) output. If differential amplifiers 17 are used, the differential amplifier itself provides the ratioed valves of the outputs of the detectors for each IOM 121–123.

The single processor 151 optionally contains a look-up table such that the value of the ratio of the outputs of any desired pair of photodetectors (such as 141 and 142) may be utilized to determine the wavelength associated therewith, as discussed above.

Figure 6:
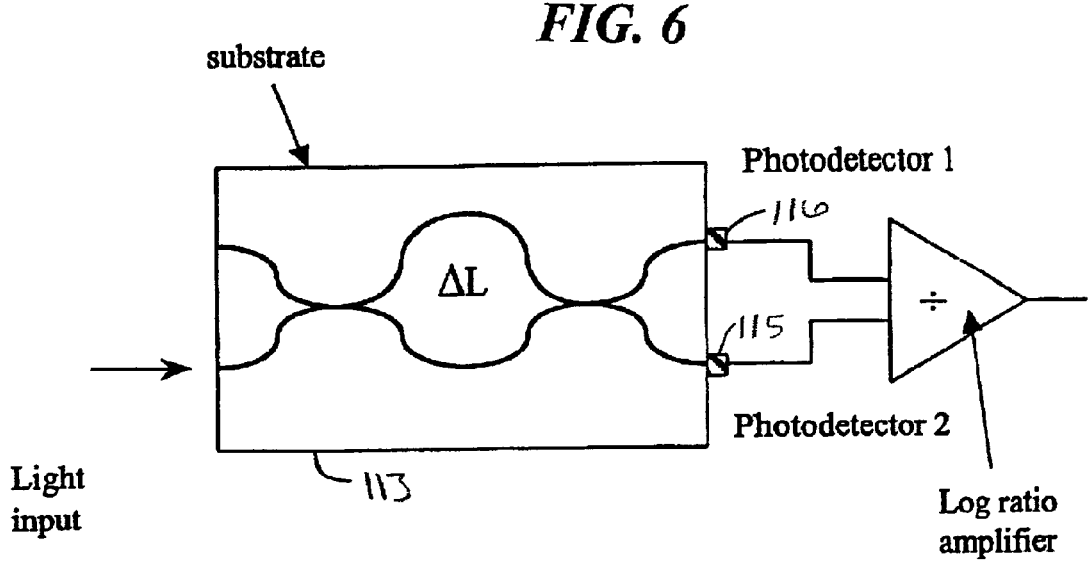
FIG. 6 is a schematic block diagram of an integrated-optic monitoring system utilizing a hybrid configuration, wherein the photodetectors and log ratio amplifier are not formed on the substrate along with the first and second paths, according to another aspect of this invention.

As show in FIG. 6, the integrated optic monitoring system of the present invention may be formed in a hybrid configuration, wherein the photodetectors 115 and 116 are not formed as part of the chip, i.e., are not formed upon the same substrate 113 as the Mach Zehnder waveguide. The chip in such a hybrid configuration can be extremely compact, measuring approximately 1 millimeter by 10 millimeters, for example. Such a hybrid configuration provides low costs, high dynamic range, and accuracy.

If the integrated optic monitoring system of the present invention has a monolithic construction as shown in FIGS. 1 and 2, then the Mach Zehnder's waveguides, the photodetectors, and, optionally the log ratio amplifier are all formed upon a common substrate. With the monolithic configuration, ultra compact, i.e., approximately 0.5 millimeters times 10 millimeters, construction is facilitated. Low costs, high dynamic range and accuracy are also provided.

As a further alternative, the Mach Zehnder waveguides of the present invention may be defined by optical fibers, such as those compromised of glass or quartz. Such optical fibers may be utilized without a substrate, formed or attached to a substrate, such as a single crystal silicon, lithium neobate, or indium phosphate substrate, or maybe formed or mounted in any other desired fashion.

Figure 7:
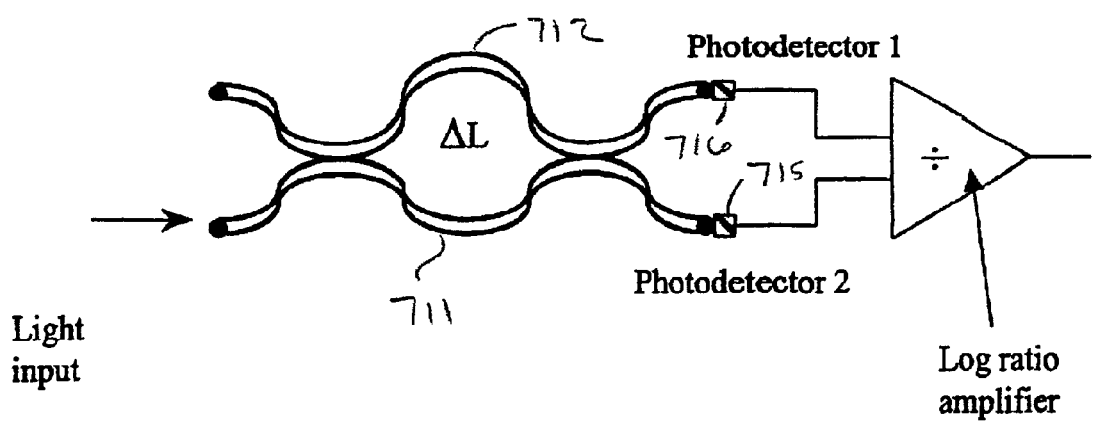
FIG. 7 is a schematic diagram showing a fiber fused Mach Zehnder optical monitoring module having pigtail photodetectors, according to another aspect of this invention.

Referring now to FIG. 7, a fused fiber Mach Zehnder optical monitoring module comprises a pair of optical fibers 711 and 712, such as those comprised of glass or quartz. The optical fiber utilizes pigtail photodetectors 715 and 716 to facilitate wavelength monitoring. The fused fibers 711 and 712 may be formed either upon a substrate or without a substrate. The substrate may comprise an integrated circuit substrate, such as a substrate formed of single crystalline silicon, lithium neobate, or indium phosphate. The wavelength monitoring device utilizing fused fibers may be formed as either a hybrid or monolithic structure.

According to one alternative configuration of the present invention, a plurality of Mach Zehnder waveguide pairs are configured such that electromagnetic radiation is communicated from one Mach Zehnder waveguide pair to another Mach Zehnder waveguide pair, so as to facilitate measurement of wavelengths for a broader range than would be facilitated by a single Mach Zehnder waveguide pair.

For example, three or more waveguides may be configured so as to define at least two separate Mach Zehnder waveguide pairs by forming the three waveguides generally in parallel with one another, and positioning the three waveguides such that electromagnetic radiation is communicated there between. Two separate Mach Zehnder waveguide configurations are defined by the three separate waveguides, with one of the three separate waveguides, i.e., the middle one, being a common component to both of the Mach Zehnder configurations. That is, one Mach Zehnder configuration is defined by an outer one of the three waveguides and the center one thereof, while another Mach Zehnder configuration is defined by the other outer waveguide and the center waveguide. In this manner, outputs taken from the center waveguides and one of the outer waveguides define one wavelength range, while outputs taken from center waveguide and the other outer waveguide define another wavelength range. Thus, the overall range of wavelengths which can be measured by this alternative configuration of the present invention is enhanced. As those skilled in the art will appreciate, any desired number, e.g., three, four, five or six, for example, of such parallel waveguides may be utilized.

The overall range of wavelengths which may be measured by the present invention may also be enhanced in another alternative configuration, wherein Mach Zehnder configurations are cascaded, or placed in serial with one another. One example of such a cascaded arrangement comprises a first Mach Zehnder configuration, wherein the two outputs thereof are each provided to a separate additional Mach Zehnder configuration. That is, one of the outputs of the first Mach Zehnder configurations is provided to a second Mach Zehnder configuration, while the other output of the first Mach Zehnder configuration is provided to a third Mach Zehnder configuration. As those skilled in the art will appreciate, any desired number, e.g., two, three, four, five or six, for example, of such stages may be utilized in such a cascaded arrangement.

Figure 8:
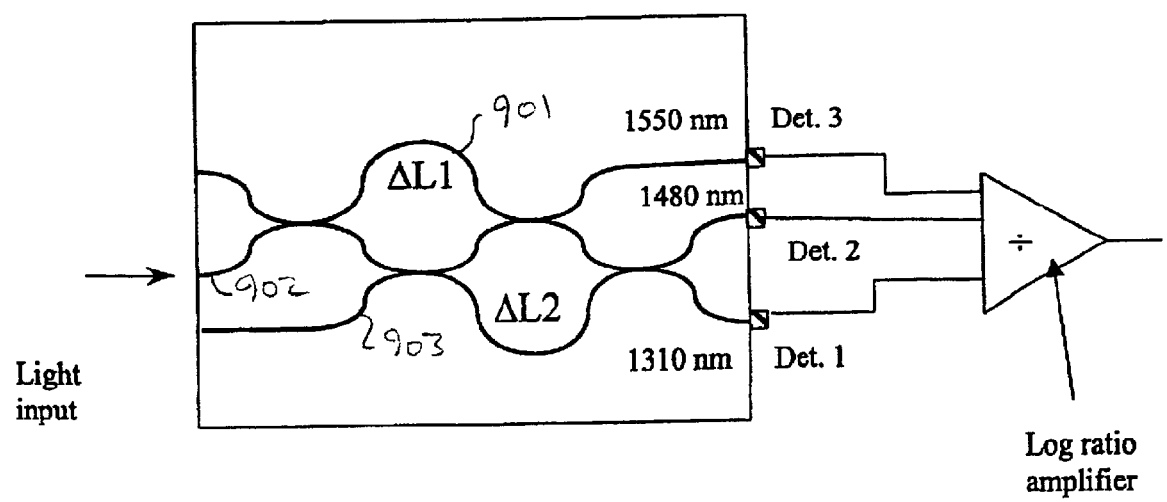
FIG. 8 is an integrated-optic monitoring module, wherein two separate Mach Zehnder interferometers are defined such that they have one optical path in common, so as to enhance the range of wavelengths which may be measured thereby and having bias tuning to adjust the center operating point and to obtain maximum sensitivity and measurement, according to another aspect of this invention.
Figure 9:
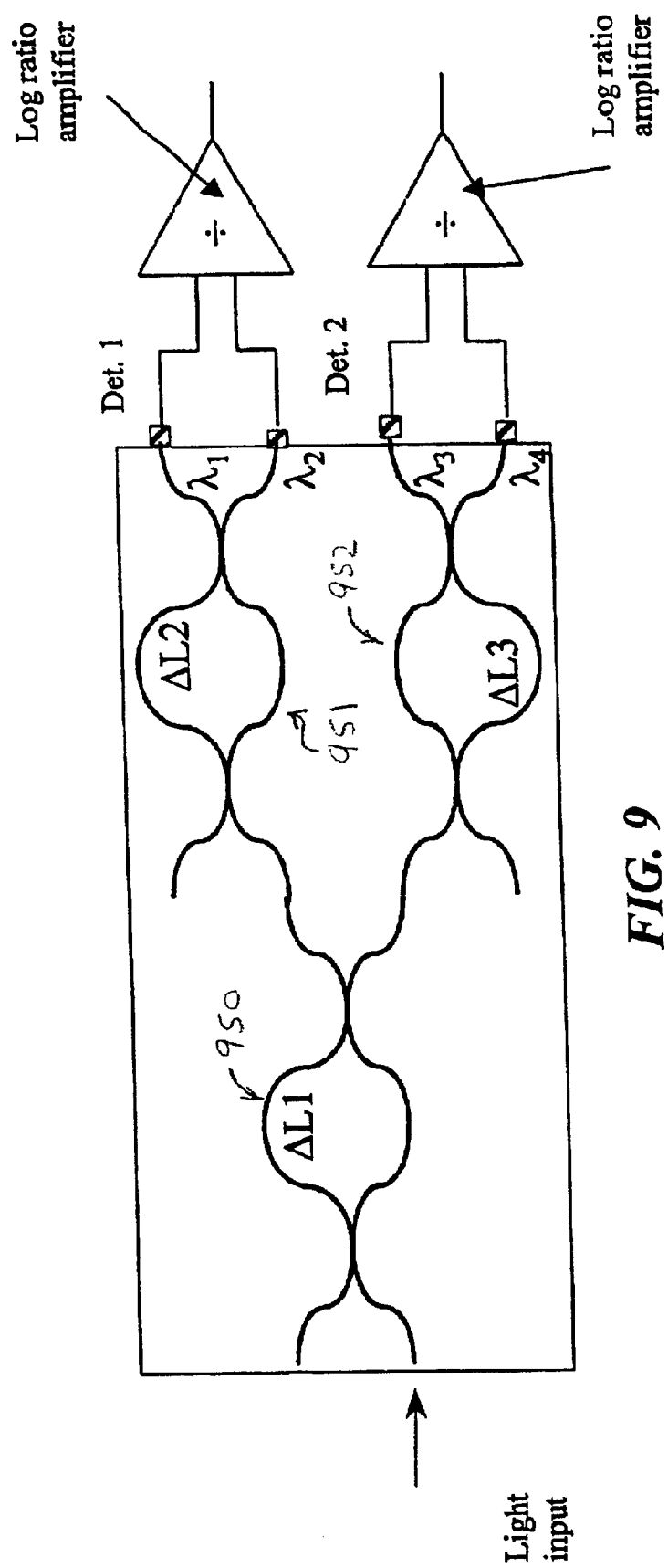
FIG. 9 an integrated-optic monitoring module, wherein three separate Mach Zehnder interferometers are used and wherein a first Mach Zehnder interferometer provides an input second and third interferometers so as to provide wavelength measurement in a desired range of wavelengths and having bias tuning to adjust the center operating point and to obtain maximum sensitivity and measurement, according to another aspect of this invention.

Referring now to FIGS. 8 and 9, the range for the wavelength monitoring device of the present invention may be extended substantially by adding waveguides, so as to define additional Mach Zehnder configurations, as discussed above. Such additional waveguides may be formed using any desired combination of optical fibers and integrated-optic waveguides.

With particular reference to FIG. 8, such additional waveguides may be added generally in parallel with a Mach Zehnder configuration, so as to define additional Mach Zehnder configurations. For example, three waveguides may be configured generally as shown in FIG. 8, so as to define two Mach Zehnder configurations (each having a common path and two unique paths, the two unique paths having a different optical path lengths), wherein a light input to the middle waveguide is provided to both Mach Zehnder configurations or waveguide pairs so as to provide two different wavelength ranges, i.e., 1310 nm–1480 nm and 1480 nm–1550 nm. Thus, the optical path length of the first optical path 901 is different from the optical path of the third optical path 903. Optical path 902 is common to both Mach Zehnder configurations. In this manner, two separate integrated-optic channel monitoring devices are formed, wherein each of the two separate integratedoptic channel monitoring device is suitable for measuring wavelengths in a different range of wavelengths. This concept can be extended indefinitely (subject to transmission losses) so as to provide desired wavelength ranges.

With particular reference to FIG. 9, an alternative multiple Mach Zehnder configuration is shown. As shown in FIG. 9, a single Mach Zehnder configuration provides its two outputs to two separate additional Mach Zehnder configurations, wherein each additional Mach Zehnder configuration has a different wavelength range. That is, the path length differences for the second 951 and third 952 Mach Zehnder configurations are different from one another. The path length of the first Mach Zehnder configuration 950 may be same as the path length difference of the second Mach Zehnder configuration 951 or the third Mach Zehnder configuration 952 or may different from the path length difference of the second Mach Zehnder configuration 951 and the third Mach Zehnder configuration 952. Such cascading of Mach Zehnder configurations may continue indefinitely (subject to transmission losses) so as to provide desired wavelength ranges.

Indeed, those skilled in the art will appreciate the various combinations of generally parallel configurations, (as shown in FIG. 8) and generally serial or cascaded Mach Zehnder configurations (as shown in FIG. 9) may be utilized, so as to provide the measurement of wavelengths in a variety of different wavelength ranges, as desired.

FIGS. 10–13 provide several exemplary implementations of the integrated-optic monitoring device of the present invention.

In particular reference to FIG. 10, the fiber-based and waveguide type optical transceiver has bi-directional wavelength and power monitoring. That is, the first integrated-optic channel monitor 810 monitors optical signals transmitted via an optical communications system, such as an optical fiber 812 to a receiver 813. Tap coupler 814 facilitates tapping of the optical signal, such that the optical signal is provided to the integrated-optic channel monitor 810. In a similar fashion, tap coupler 817 facilitates monitoring of the signal from the transmitter 800 to the optical fiber 812, utilizing second integrated-optic channel monitor 811. Each integrated optic channel monitor, 810 and 811, comprises an integrated optic channel monitor according to the present invention.

Thus, the present invention facilitates low cost, low loss and high precision wavelength monitoring in optical communication systems such as wave length division multiplexed (WDM) and dense wavelength division multiplexed (DWDM) fiber optic systems.

Transmitters, such as those utilizing Fabry-Perot lasers, distributed feedback lasers (DFB), vertical cavity surface emitting lasers (VCSEL), and tunable lasers are accommodated. According to the present invention, the receiver can be a PIN detector, APD detector, MSM detector, or any other suitable detector.

The tap couplers 814 and 817 can be 90/10% or 99/1% or any other desired percentage ratio.

The DWM coupler 816 can be a 1310 nm/1550 nm or 1480/1550 nm or 1500/1600 nm, or any other desired coupler, depending upon the desired wavelength coverage of the transmitter.

With particular reference to FIG. 11, the first integrated-optic monitor 810, the second integrated-optic monitor 811, the transmitter 800, the receiver 813, the first tap coupler 814, the second tap coupler 817, and/or the WDM coupler 816 may all be formed upon a common substrate 813, if desired.

Figure 12:
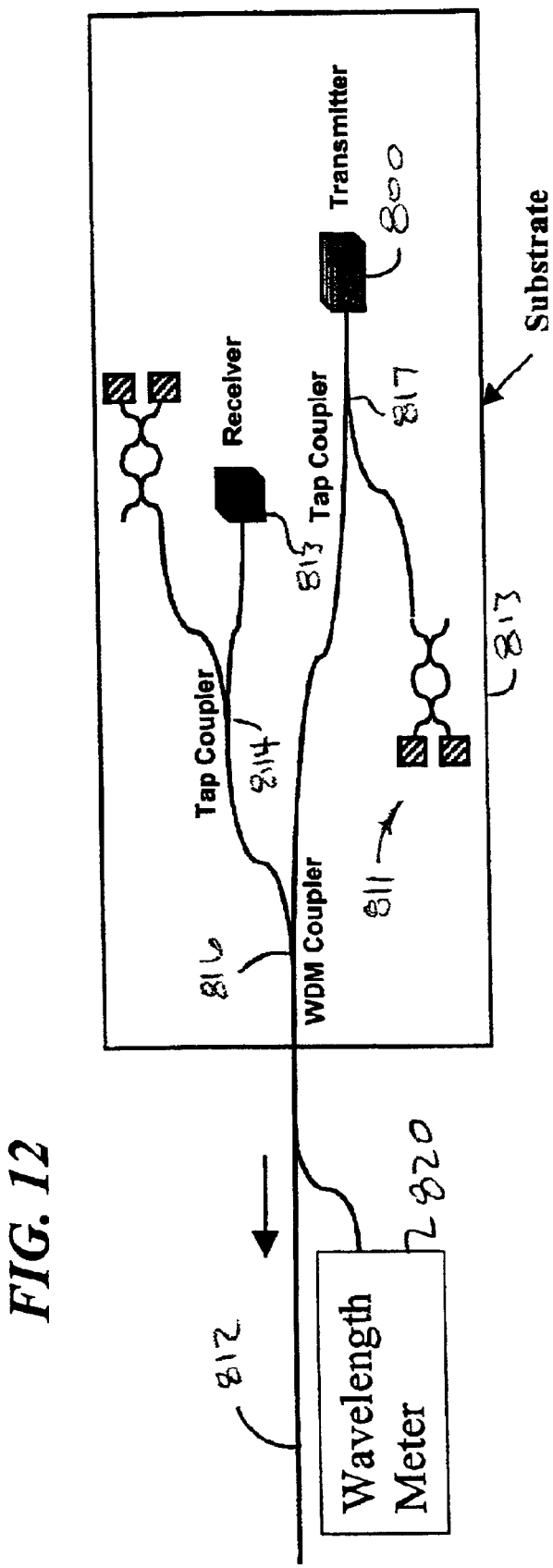
FIG. 12 is a schematic diagram showing calibration of a transmitters using a precision wavelength meter, according to the present invention.

With particular reference to FIG. 12, a wavelength meter 820 may be used for calibration of the transmitter and/or may be used to facilitate calibration and/or verify proper operation of the transmitted signal integrated-optic channel monitor 811.

Figure 13:
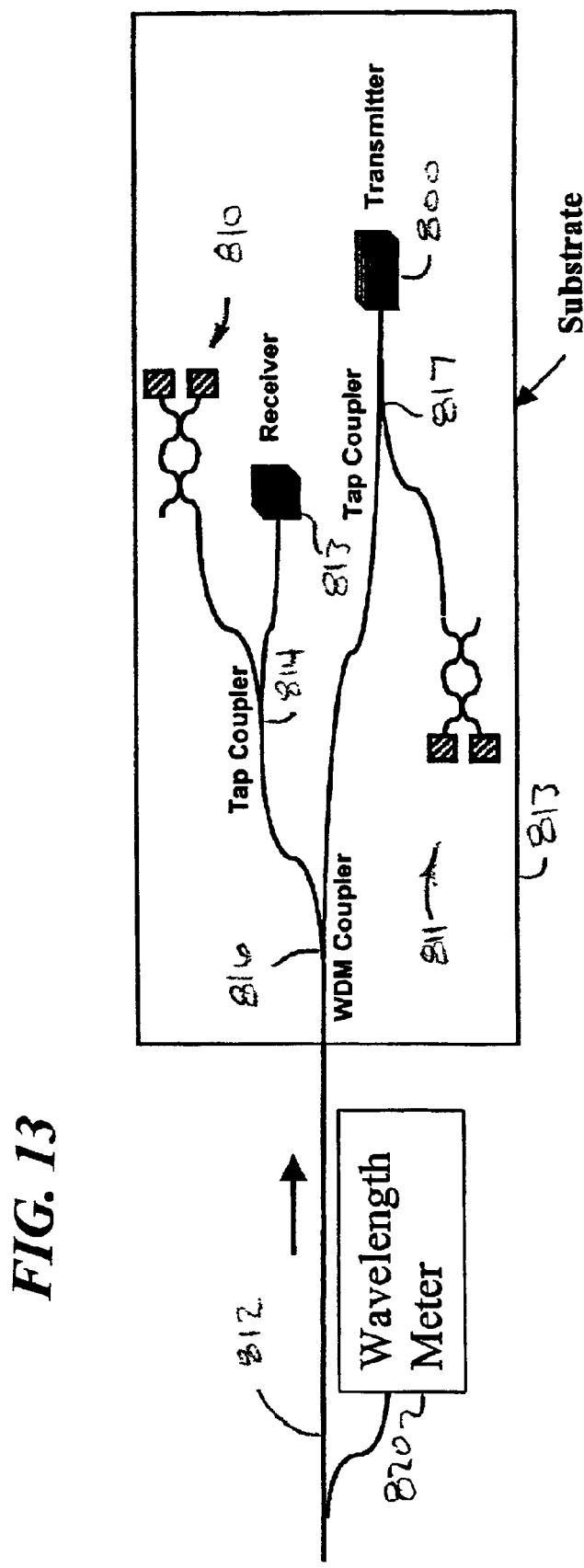
FIG. 13 is a schematic diagram showing calibration of a receiver using a precision wavelength meter, according to the present invention.

With particular referenced to FIG. 13, a wavelength monitor 820 may similarly be used to facilitate calibration of the receiver and/or to facilitate calibration and/or verify proper operation of the received signal integrated-optic channel monitor 810.

The substrate 813 can be any desired substrate, such as indium phosphate, lithium niobate, silicon-on-silicon, SOI, polymer, InGaAsp, as well as hybrid laser-detector chips mounted on semiconductor substrates.

The method and apparatus for monitoring wavelength and power of the present invention may be used in a variety of different application, such as in telecommunication and for measuring the output of a laser in the systems other that telecommunications systems. The present invention may be used to monitor the wavelength and power of a tunable laser, a precision wavelength addressable laser or a tunable diode laser.

It is understood that the exemplary method and apparatus for determining the wavelength of an electromagnetic signal described herein and shown in the drawings represents only presently preferred embodiments of the invention. Indeed, various modifications and additions may be made to such embodiments without departing from the specified scope of the invention. For example, analog circuitry may be utilized (rather than the analog-to-digital converter 150) to determine the wavelength of each channel and/or to effect closed loop control thereof. Also, a formula which generally describes the curve (FIG. 4), which relates the ratio of the outputs for a pair of photodetectors to a wavelength, may be utilized to calculate a wavelength from the ratio, rather than using a lookup table. Thus, these and other modifications and additions may be obvious to those skilled in the art and may be implemented to adapt the present invention for use in a variety different applications.

A device for measuring a wavelength of an electromagnetic signal, the device comprising: first and second waveguides configured such that a portion of an electromagnetic signal transmitted through the first waveguide is separated from a remaining portion of the electromagnetic signal and is communicated to the second waveguide and is subsequently at least partially recombined with the remaining electromagnetic signal in the first wave guide after traveling a distance which is different from the distance traveled by the remaining electromagnetic signal in the first wave guide; a first sensor configured to measure a power of the electromagnetic signal in the first waveguide after at least a portion of the separated electromagnetic signal in the second waveguide has been recombined with the remaining electromagnetic signal in the first waveguide; a second sensor configured to measure a power of the electromagnetic signal in the second waveguide after at least a portion of the separated electromagnetic signal in the second waveguide has been recombined with the remaining electromagnetic signal in the first waveguide; and wherein the first and second waveguides are formed upon and integrally with a common semiconductor substrate. The device as recited above, wherein the first and second waveguides are configured to transmit an optical signal.

The device as recited above, wherein the first and second the waveguides are configured to transmit an infrared optical signal.

The device as recited above, wherein the first and second waveguides comprise a semiconductor material.

The device as recited above, wherein the first and second waveguides comprise substantially a same type of semiconductor material as the substrate.

The device as recited above, where in the first and second waveguides comprise silicon and are formed upon and integrally with a silicon substrate.

The device as recited above, wherein the first and second waveguides comprise substantially single crystalline silicon and are formed upon and integrally with a substantially single crystalline silicon substrate.

The device as recited above, wherein the first and second waveguides comprise single mode waveguides.

The device as recited above, wherein the first and second waveguides are generally square in cross-section.

The device as recited above, wherein the first and second waveguides a re generally square in cross-section and wherein each side of the cross-section has a length of between approximately 3 microns and approximately 4 microns.

The device as recited above, wherein the first and second waveguides are approximately 2 microns apart where the electromagnetic signal is separated and where the electromagnetic signal is at least partially recombined.

The device as recited above, wherein the substrate comprises: a first substrate layer comprised of substantially single crystalline silicon; a second substrate layer comprised of at least one of single crystalline silicon and polycrystalline silicon; and an insulating layer comprised of silicon dioxide disposed generally intermediate the first and second substrate layers.

The device as recited above, wherein the substrate comprises: a first substrate layer comprised of substantially single crystalline silicon; a second substrate layer comprised of at least one of single crystalline silicon and polycrystalline silicon; an insulating layer comprised of silicon dioxide disposed generally intermediate the first and second substrate layers; and wherein the first substrate layer has a thickness of between approximately 0.2 micron and approximately 2 microns.

The device as recited above, wherein the substrate comprises lithium niobate.

The device as recited above, wherein the substrate comprises indium phosphate.

The device as recited above, wherein the sensor is photodetector.

The device as recited above, further comprising an optical path length adjuster configured to change an effective optical path length of at least one of the first and second waveguides.

The device as recited above, further comprising: a first optical path length adjuster configured to change the effective optical path length of both of the first and second waveguides together; and a second optical path length adjuster configured to change the effective optical path length of one of the first and second waveguides.

The device as recited above, further comprising an optical path length adjuster configured to change the effective optical path length of at least one of the first and second waveguides by varying a length thereof.

The device as recited above, further comprising an optical path length adjuster configured to change the effective optical path length of at least one of the first and second waveguides by varying an index of refraction of at least a portion thereof.

The device as recited above, further comprising an optical path length adjuster configured to change the effective optical path length of at least one of the first and second waveguides, the optical path length adjuster comprising a resistor configured to effect thermal expansion of at least one of the first and second waveguides.

The device as recited above, further comprising an optical path length adjuster configured to change the effective optical path length of at least one of the first and second waveguides, the optical path length adjuster comprising a material having an electrically variable index of refraction.

The device as recited above, further comprising a circuit configured to use outputs of the first and second sensors to determine a wavelength of the electromagnetic signal.

The device as recited above, further comprising a circuit configured to use outputs of the first and second sensors to determine a wavelength and a power of the electromagnetic signal.

The device as recited above, further comprising: a logarithmic ratio amplifier coupled so as to receive outputs of the first and second sensors, the logarithmic ratio amplifier providing an output which is proportional to a ratio of the outputs of the first and second sensors; and a lookup table configured to provide a wavelength of the electromagnetic signal which corresponds to a signal representative of the output of the logarithmic ratio amplifier.

The device as recited above, further comprising: a logarithmic ratio amplifier coupled to receive outputs of the first and second sensors, the logarithmic ratio amplifier providing an output which is proportional to ratio of the outputs of the first and second amplifiers; an analog to digital converter configured to convert an analog output of the logarithmic ratio amplifier into a digital signal representative thereof; and a lookup table configured to provide a wavelength of the electromagnetic signal which corresponds to a digital output of the analog to digital converter.

The device as recited above, further comprising: a logarithmic ratio amplifier coupled to receive outputs of the first and second sensors, the logarithmic ratio amplifier providing an output which is proportional to a ratio of the outputs of the first and second amplifiers; an analog to digital converter configured to convert an analog output of the logarithmic ratio amplifier into a digital signal representative thereof; a lookup table for providing a wavelength of the electromagnetic signal which corresponds to a digital output of the analog to digital converter; and wherein the first and second waveguides, the first and second sensors, the logarithmic ratio amplifies, the analog to digital converter and the lookup table are formed upon a common substrate to at least partially define an integrated circuit chip.

The device as recited above, further comprising a summing circuit for summing an output of the first and second sensors so as to facilitate determination of a power of the electromagnetic signal.

The device as recited above, further comprising: an analog to digital converter coupled so as to receive an output from the first and second sensors and to provide a digital signal representative thereof; and a summing circuit configured to sum digitized outputs of the first and second sensors so as to facilitate determination of a power of the electromagnetic signal.

The device as recited above, wherein the first and second waveguides define a Mach Zehnder configuration.

A device for measuring a wavelength of an electromagnetic signal, the device comprising: a Mach Zehnder waveguide assembly comprising at least first and second waveguides formed upon a common semiconductor substrate; and a sensor coupled so as to receive an electromagnetic signal from each waveguide to facilitate measurement of an electromagnetic signal communicated there through.

An integrated circuit optical channel power and wavelength monitoring system comprising: A) a demultiplexor configured to receive a composite infrared optical input signal having a plurality of components, each component having a different wavelength, the demultiplexor also being configured to provide a plurality of single component output signals; B) a plurality of waveguide assemblies, each waveguide assembly being coupled so as to receive a dedicated one of the single component output signals of the demultiplexor and each waveguide assembly comprising: (i) a substrate comprised of: (a) a first substrate layer comprised of substantially single crystalline silicon; (b) a second substrate layer comprised of at least one of single crystalline silicon and polycrystalline silicon; (c) an insulating layer comprised of silicon dioxide disposed generally intermediate the first and second substrate layers; (ii) first and second waveguides formed upon the first substrate layer, the first and second waveguides being comprised of substantially single crystalline silicon and being formed generally integrally with the first substrate, the first and second waveguides cooperating to define a Mach Zehnder configuration, the Mach Zehnder configuration having a splitter and a recombiner/splitter and the first and second waveguides having different lengths; (iii) a first optical path length adjuster configured to adjust an effective optical path length of both the first and second waveguides together; (iv) a second optical path length adjuster configured to adjust an effective optical path length of one of the first and second waveguides; C) a plurality of sensors pairs, each sensor pair comprising two sensors, each of which provides an analog electrical output which is proportional to a power of an infrared signal incident thereon and each sensor of a sensor pair being coupled to receive an optical output of one of the Mach Zehnder waveguide assemblies; D) a plurality of logarithmic ratio amplifiers, each logarithmic ratio amplifier being coupled so as to receive the analog electrical outputs from both of the sensors of each sensor pair and so as to provide an analog electrical output which is proportional to a ratio of the analog electrical outputs from the two sensors; E) an analog to digital converter coupled so as to receive an output of each logarithmic ratio amplifier and to provide a digital output representative thereof; F) a signal processor coupled so as to receive a digital output of the analog to digital converter, the signal processor comprising a lookup table configured to associates a wavelength with a digital output of each waveguide assembly; and G) wherein the demultiplexer, the waveguide assemblies, the sensor pairs, the logarithmic ratio amplifiers, the analog to digital converter and the signal processor are formed so as to define a single integrated circuit chip.

A method for measuring a wavelength of an electromagnetic signal, the method comprising: separating the electromagnetic signal into two intermediate portions; communicating the two intermediate portions over two different paths, wherein the two different paths have different lengths; at least partially recombining the two intermediate portions to form a recombined electromagnetic signal; separating the recombined electromagnetic signal into two final signals; sensing a power of each of the two final signals; determining the wavelength of the electromagnetic signal from the sensed power of the two final signals; and wherein separating the electromagnetic signal, communicating the two intermediate portions, recombining the two portions and separating the recombined electromagnetic signal are facilitated by first and second waveguides which are formed upon and integrally with a common substrate.

The method as recited above, wherein the electromagnetic signal comprises an optical signal.

The method as recited above, wherein the electromagnetic signal comprises an infrared optical signal.

The method as recited above, wherein separating the electromagnetic signal, communicating the two intermediate portions, at least partially recombining the two intermediate portions and separating the recombined electromagnetic signal are facilitated by first and second waveguides formed in a Mach Zehnder configuration.

The method as recited above, wherein separating the electromagnetic signal, communicating the two intermediate portions, at least partially recombining the two intermediate portions and separating the recombined electromagnetic signal are facilitated by first and second waveguides comprised of a semiconductor material.

The method as recited above, wherein separating the electromagnetic signal, communicating the two intermediate portions, at least partially recombining the two intermediate portions and separating the recombined electromagnetic signal are facilitated by first and second waveguides comprised of a semiconductor material formed upon a substrate which is comprised of substantially the same type of semiconductor material.

The method as recited above, wherein separating the electromagnetic signal, communicating the two intermediate portions, at least partially recombining the two intermediate portions and separating the recombined electromagnetic signal are facilitated by first and second waveguides comprised of silicon formed upon a substrate which is also comprised of silicon.

The method as recited above, wherein separating the electromagnetic signal, communicating the two intermediate portions, at least partially recombining the two intermediate portions and separating the recombined electromagnetic signal are facilitated by first and second waveguides comprised of single crystalline silicon formed upon a substrate which is also comprised of single crystal silicon.

The method as recited above, wherein separating the electromagnetic signal, communicating the two intermediate portions, at least partially recombining the two intermediate portions and separating the recombined electromagnetic signal are facilitated by two single mode waveguides.

The method as recited above, wherein separating the electromagnetic signal, communicating the two intermediate portions, at least partially recombining the two intermediate portions and separating the recombined electromagnetic signal are facilitated by first and second waveguides which are generally square in cross-section.

The method as recited above, wherein separating the electromagnetic signal, communicating the two intermediate portions, at least partially recombining the two intermediate portions and separating the recombined electromagnetic signal are facilitated by first and second waveguides which are generally square in cross-section, wherein each side of the square cross-section has a length of between approximately 3 microns and approximately 4 microns.

The method as recited above, wherein separating the electromagnetic signal, communicating the two intermediate portions, at least partially recombining the two intermediate portions and separating the recombined electromagnetic signal are facilitated by first and second waveguides and wherein the first and second waveguides are approximately 2 microns apart where the electromagnetic signal is separated and where the electromagnetic signal is at least partially recombined.

The method as recited above, wherein separating the electromagnetic signal, communicating the two intermediate portions, at least partially recombining the two intermediate portions and separating the recombined electromagnetic signal are facilitated by first and second waveguides formed upon a substrate which comprises: a first substrate layer comprised of substantially single crystalline silicon; a second substrate layer comprised of at least one of single crystalline silicon and polycrystalline silicon; and an insulating layer comprised of silicon dioxide disposed generally intermediate the first and second substrate layers.

The method as recited above, wherein separating the electromagnetic signal, communicating the two intermediate portions, at least partially recombining the two intermediate portions and separating the recombined electromagnetic signal are facilitated by first and second waveguides formed upon a substrate which comprises: a first substrate layer comprised of substantially single crystalline silicon; a second substrate layer comprised of at least one of single crystalline silicon and polycrystalline silicon; an insulating layer comprised of silicon dioxide disposed generally intermediate the first and second substrate layers; and wherein the first substrate layer has a thickness of between approximately 0.2 micron and approximately 2 microns.

The method as recited above, wherein separating the electromagnetic signal, communicating the two intermediate portions, at least partially recombining the two intermediate portions and separating the recombined electromagnetic signal are facilitated by first and second waveguides formed upon a substrate which comprises lithium neobate.

The method as recited above, wherein separating the electromagnetic signal, communicating the two intermediate portions, at least partially recombining the two intermediate portions and separating the recombined electromagnetic signal are facilitated by first and second waveguides formed upon a substrate which comprises indium phosphate.

The method as recited above, wherein measuring a power of each of the two final signal comprises sensing each of the two signals with a photodetector.

The method as recited above, further comprising changing an effective optical path length of at least one of the first and second paths so as to facilitate measurement of a wavelength of an electromagnetic signal within a desired range of wavelengths.

The method as recited above, further comprising: changing an effective optical path length of both of the first and second paths with a first optical path length adjuster; and changing an effective optical path length one of the first and second paths with a second optical path length adjuster.

The method as recited above, further comprising varying an optical path length of at least one of the first and second paths by varying a length thereof.

The method as recited above, further comprising varying an optical path length of at least one of the first and second paths by varying an index of refraction of at least a portion thereof.

The method as recited above, further comprising changing an optical path length of at least one of the first and second paths via a resistor configured to effect thermal expansion of at least one of the first and second paths.

The method as recited above, further comprising changing an effective optical path length of at least one of the first and second paths via an optical path length adjuster comprising a material having an electrically variable index of refraction.

The method as recited above, further comprising changing an effective optical path length of at least one of the first and second paths via thermal expansion of at least one of the first and second paths.

The method as recited above, wherein sensing a power of the two final signals facilitates determining a power of the electromagnetic signal.

The method as recited above, wherein sensing a power of the two final signals facilitates determining a power of the electromagnetic signal by summing the outputs of the first and second sensors.

The method as recited above, further comprising: communicating outputs of first and second sensors to a logarithmic ratio amplifier, the logarithmic ratio amplifier providing an output which is proportional to the ratio of the outputs of the first and second amplifiers; and using a lookup table to providing a wavelength of the electromagnetic signal which corresponds to a signal representative of the output of the logarithmic ratio amplifier.

The method as recited above, further comprising: communicating outputs of first and second sensors to a logarithmic ratio amplifier, the logarithmic ratio amplifier providing an output which is proportional to the ratio of the outputs of the first and second amplifiers; converting an analog output of the logarithmic ratio amplifier into a digital signal representative thereof; and using a lookup table to provide a wavelength of the electromagnetic signal which corresponds to a digital output of the analog to digital converter.

The method as recited above, further comprising: communicating outputs of first and second sensors to a logarithmic ratio amplifier, the logarithmic ratio amplifier providing an output which is proportional to the ratio of the outputs of the first and second amplifiers; converting an analog output of the logarithmic ratio amplifier into a digital signal representative thereof; using a lookup table to provide a wavelength of the electromagnetic signal which corresponds to a digital output of the analog to digital converter; and wherein the first and second waveguides, the first and second sensors, the logarithmic ratio amplifies, the analog to digital converter and the lookup table are formed upon a common substrate to define an integrated circuit chip.

The method above, wherein determining the wavelength of the electromagnetic signal from the sensed power of the two final signals comprises; sensing the power of the two final signals via two photodetectors; providing output signals from the two photodetectors to a differential amplifier, varying an optical path length of one of the two paths so as to approximately zero an output of the differential amplifier, the path length being varied via the application of an electrical signal; and determining the wavelength of the electromagnetic signal from the electrical signal which causes the output of the differential amplifier to be approximately zero.

The method as recited above, further comprising summing an output of the first and second sensors so as to facilitate determination of a power of the electromagnetic signal.

The method as recited above, further comprising: communicating an output from first and second sensors to an analog to digital converter which provides a digital signal representative thereof; and summing digitized outputs of the first and second sensors so as to facilitate determination of a power of the electromagnetic signal.

The method as recited above, wherein the first and second waveguides define a Mach Zehnder configuration.

A method for manufacturing a device for measuring a wavelength of an electromagnetic signal, the method comprising: forming a substrate having a semiconductor layer in laminar juxtaposition to an insulating layer, forming first and second waveguides upon the semiconductor layer such that the first and second waveguides are configured to facilitate: separating the electromagnetic signal into two intermediate portions; communicating the two intermediate portions over two different paths, wherein the two different paths have different lengths; at least partially recombining the two intermediate portions to form a recombined electromagnetic signal; separating the recombined electromagnetic signal into two final signals; sensing a power of each of the two final signals; and determining the wavelength of the electromagnetic signal from the sensed power of the two final signals.

The method as recited above, wherein forming a substrate comprises forming a substrate which comprises: a first substrate layer comprised of substantially single crystalline silicon; a second substrate layer comprised of at least one of single crystalline silicon and polycrystalline silicon; and an insulating layer comprised of silicon dioxide disposed generally intermediate the first and second substrate layers.

The method as recited above, wherein forming a substrate comprises forming a substrate which comprises: a first substrate layer comprised of substantially single crystalline silicon; a second substrate layer comprised of at least one of single crystalline silicon and polycrystalline silicon; an insulating layer comprised of silicon dioxide disposed generally intermediate the first and second substrate layers; and wherein the first substrate layer has a thickness of between approximately 0.2 micron and approximately 2 microns.

The method as recited above, wherein forming a substrate comprises forming a substrate having a substantially single crystalline layer and a silicon dioxide layer utilizing a bond and etchback (BESOI) process.

The method as recited above, wherein forming a substrate comprises forming a substrate having a substantially single crystalline layer and a silicon dioxide layer utilizing a separation by implantation of oxygen (SIMOX) process.

The method as recited above, wherein forming a substrate comprises forming a substrate having a substantially single crystalline layer and a silicon dioxide layer utilizing a Smart Cut® process.

The method as recited above, wherein forming a substrate comprises forming a substrate which comprises lithium niobate.

The method as recited above, wherein forming a substrate comprises forming a substrate which comprises indium phosphate.

The method as recited above, wherein forming the first and second waveguides comprises removing material from the substrate.

The method as recited above, wherein forming the first and second waveguides comprises etching the substrate.

The method as recited above, wherein the waveguides define a Mach Zehnder configuration.

A device for measuring a wavelength of an electromagnetic signal, the device being manufactured by a method comprising: forming a substrate having a semiconductor layer in laminar juxtaposition to an insulating layer; forming first and second waveguides upon the semiconductor layer such that the first and second waveguides are configured to facilitate: separating the electromagnetic signal into two intermediate portions; communicating the two intermediate portions over two different paths, wherein the two different paths have different lengths; at least partially recombining the two intermediate portions to form a recombined electromagnetic signal; separating the recombined electromagnetic signal into two final signals; sensing a power of each of the two final signals; and determining the wavelength of the electromagnetic signal from the sensed power of the two final signals.

The device as recited above, wherein forming a substrate comprises forming a substrate which comprises: a first substrate layer comprised of substantially single crystalline silicon; a second substrate layer comprised of at least one of single crystalline silicon and polycrystalline silicon; and an insulating layer comprised of silicon dioxide disposed generally intermediate the first and second substrate layers.

The device as recited above, wherein forming a substrate comprises forming a substrate which comprises: a first substrate layer comprised of substantially single crystalline silicon; a second substrate layer comprised of at least one of single crystalline silicon and polycrystalline silicon; an insulating layer comprised of silicon dioxide disposed generally intermediate the first and second substrate layers; and wherein the first substrate layer has a thickness of between approximately 0.2 micron and approximately 2 microns.

The device as recited above, wherein forming a substrate comprise forming a substrate having a substantially single crystalline layer and a silicon dioxide layer utilizing a bond and etchback (BESOI) process.

The device as recited above, wherein forming a substrate comprise forming a substrate having a substantially single crystalline layer and a silicon dioxide layer utilizing a separation by implantation of oxygen (SIMOX) process.

The device as recited above, wherein forming a substrate comprise forming a substrate having a substantially single crystalline layer and a silicon dioxide layer utilizing a Smart Cut® process.

The device as recited above, wherein forming a substrate comprises forming a substrate which comprises lithium niobate.

The device as recited above, wherein forming a substrate comprises forming a substrate which comprises indium phosphate.

The device as recited above, wherein forming the first and second waveguides comprises removing material from the substrate.

The device as recited above, wherein forming the first and second waveguides comprises etching the substrate.

The device as recited above, wherein the waveguides define a Mach Zehnder configuration.

A device for measuring a wavelength of an electromagnetic signal, the device comprising: first and second waveguides configured such that a portion of an electromagnetic signal transmitted through the first waveguide is separated from a remaining portion of the electromagnetic signal and is communicated to the second waveguide and is subsequently at least partially recombined with the remaining electromagnetic signal in the first wave guide after traveling a distance which is different from the distance traveled by the remaining electromagnetic signal in the first wave guide; and wherein the first and second waveguides are formed upon and integrally with a common semiconductor substrate.

A device for measuring a wavelength of an electromagnetic signal for use in optical telecommunications and the like, the device comprising: a Mach Zehnder waveguide assembly comprising at least two waveguides formed upon a common semiconductor substrate: and the formation thereof utilizing integrated circuit fabrication techniques.

Wherein formation of the two waveguides upon the common semiconductor substrate facilitates a wavelength monitor comprising a plurality of Mach Zehnder waveguide pairs configured such that electromagnetic radiation is communicated from one Mach Zehnder waveguide pair to another Mach Zehnder waveguide pair to facilitate measurement of wavelength for a broader range that would be facilitated by on Mach Zehnder waveguide pair of the plurality of Mach Zehnder waveguide pair.

The wavelength monitor as recited above, wherein the plurality of Mach Zehnder waveguide pairs comprises at least three waveguides which define at least two Mach Zehnder waveguide pairs with one waveguide being common to at least two Mach Zehnder waveguide pairs.

The wavelength monitor as recited above, wherein the plurality of Mach Zehnder waveguide pairs comprises at least three Mach Zehnder waveguide pairs and wherein one of the three Mach Zehnder waveguide pairs is in series with the other two Mach Zehnder waveguide pairs and the other two Mach Zehnder waveguide pairs are in parallel with one another.

The wavelength monitor as recited above, wherein the plurality of Mach Zehnder waveguide pairs comprises a plurality of Mach Zehnder waveguide pairs which are defined by a hybrid of parallel and serial waveguides.

The wavelength monitor as recited above, wherein the waveguide pairs are formed upon a substrate.

The wavelength monitor as recited above, wherein the first waveguide pairs are formed upon a substrate comprised of silicon.

The wavelength monitor as recited above, wherein the waveguide pairs are formed upon a substrate comprised of single crystalline silicon.

The wavelength monitor as recited above, wherein the waveguide pairs are formed upon a substrate comprised of lithium neobate.

The wavelength monitor as recited above, wherein the waveguide pairs are formed upon a substrate comprised of indium phosphate.

The wavelength monitor as recited above, wherein the waveguide pairs are configured to facilitate the measurement of a wavelength of optical electromagnetic radiation.

The wavelength monitor as recited above, wherein the waveguide pairs are configured to facilitate the measurement of a wavelength of infrared electromagnetic radiation.

The wavelength monitor as recited above, further comprising a demultiplexer configured to separate a composite electromagnetic signal into a plurality of separate component electromagnet signals, at least one of the separate electromagnetic signals being communicated to waveguide pairs which are configured such that a portion of an electromagnetic signal transmitted through a first waveguide is separated from a remaining portion of the electromagnetic signal and is communicated to a second waveguide and is subsequently at least partially recombined with the remaining electromagnetic signal in the first waveguide after traveling a distance which is different from the distance traveled by the remaining electromagnetic signal in the first waveguide.

A wavelength monitor comprising: at least three waveguides configured so as to define at least two Mach Zehnder waveguide pairs; wherein at least two of the Mach Zehnder pairs share a common waveguide; and wherein each Mach Zehnder waveguide pair facilitates measurement of a range of wavelengths.

A wavelength monitor comprising: at least three generally parallel waveguides configured so as to define at least two Mach Zehnder waveguide pairs; wherein at least two of the Mach Zehnder pairs share a common waveguide; and wherein each Mach Zehnder waveguide pair facilitates measurement of a range of wavelengths.

A waveguide monitor comprising: a first Mach Zehnder waveguide pair having first and second outputs; a second Mach Zehnder waveguide pair couple to the first Mach Zehnder pair so as to receive an electromagnetic signal from the first output thereof; a third Mach Zehnder waveguide pair couple to the first Mach Zehnder pair so as to receive an electromagnetic signal from the second output thereof; and wherein the use of three Mach Zehnder waveguide pairs provides measurement of wavelength over an enhance range with respect to a range of one of the three mach Zehnder waveguide pairs.

A wavelength monitor comprising: a plurality of waveguide pairs, each waveguide pair comprising: first and second waveguides configured such that a portion of an electromagnetic signal transmitted through the first waveguide is separated from a remaining portion of the electromagnetic signal and is communicated to the second waveguide and is subsequently at least partially recombined with the remaining electromagnetic signal in the first waveguide after traveling a distance which is different from the distance traveled by the remaining electromagnetic signal in the first waveguide; wherein the waveguide pairs are configured such that electromagnetic radiation is communicated from one waveguide pair to another waveguide pair to facilitate measurement of wavelength for a broader range that would be facilitated by one waveguide pair of the plurality of waveguide pairs.

The wavelength monitor as recited above, wherein the plurality of waveguide pairs comprises at least three waveguides which define at least two waveguide pairs with one waveguide being common to at least two waveguide pairs.

The wavelength monitor as recited above, wherein the plurality of waveguide pairs comprises at least three waveguide pairs and wherein one of the three waveguide pairs is in series with the other two waveguide pairs and the other two waveguide pairs are in parallel with one another.

The wavelength monitor as recited above, wherein the plurality of waveguide pairs comprises a plurality of waveguide pairs which arc defined by a hybrid of parallel and serial waveguides.

The wavelength monitor as recited above, wherein the waveguide pairs are formed upon a substrate.

The wavelength monitor as recited above, wherein the first waveguide pairs are formed upon a substrate comprised of silicon.

The wavelength monitor as recited above, wherein the waveguide pairs are formed upon a substrate comprised of single crystalline silicon.

The wavelength monitor as recited above, wherein the waveguide pairs are formed upon a substrate comprised of lithium neobate.

The wavelength monitor as recited above, wherein the waveguide pairs are formed upon a substrate comprised of indium phosphate.

The wavelength monitor as recited above, wherein the waveguide pairs are configured to facilitate the measurement of a wavelength of optical electromagnetic radiation.

The wavelength monitor as recited above, wherein the waveguide pairs are configured to facilitate the measurement of a wavelength of infrared electromagnetic radiation.

The wavelength monitor as recited above, further comprising a demultiplexer configured to separate a composite electromagnetic signal into a plurality of separate component electromagnet signals, at least one of the separate electromagnetic signals being communicated to waveguide pairs which are configured such that a portion of an electromagnetic signal transmitted through a first waveguide is separated from a remaining portion of the electromagnetic signal and is communicated to a second waveguide and is subsequently at least partially recombined with the remaining electromagnetic signal in the first waveguide after traveling a distance which is different from the distance traveled by the remaining electromagnetic signal in the first waveguide.

A wavelength monitor comprising: a pair of optical fibers configured in a Mach Zehnder configuration; wherein outputs of the pair of optical fibers facilitate measurement of electromagnetic radiation communicated there through.

A waveguide monitor comprising: first and second optical fibers configured such that a portion of an electromagnetic signal transmitted through the first optical fiber is separated from a remaining portion of the electromagnetic signal and is communicated to the second optical fiber and is subsequently at least partially recombined with the remaining electromagnetic signal in the first optical fiber after traveling a distance which is different from the distance traveled by the remaining electromagnetic signal in the first optical fiber.

The wavelength monitor as recited above, further comprising: a first sensor configured to measure a power of the electromagnetic signal from the first optical fiber; a second sensor configured to measure a power of the electromagnetic signal from the second optical fiber; wherein outputs of the first and second sensors facilitate determination of a wavelength of the electromagnetic signal.

The wavelength monitor as recited above, wherein the first and second optical fiber comprise glass optical fibers.

The wavelength monitor as recited above, wherein the first and second optical fiber comprise quartz optical fibers.

The wavelength monitor as recited above, wherein the first and second optical fibers are not formed upon a substrate.

The wavelength monitor as recited above, wherein the first and second optical fibers are not formed upon or attached to a substrate.

The wavelength monitor as recited above, wherein the first and second optical fibers are formed upon a substrate.

The wavelength monitor as recited above, wherein the first and second optical fibers are formed upon a substrate comprised of silicon.

The wavelength monitor as recited above, wherein the first and second optical fibers are formed upon a substrate comprised of single crystalline silicon.

The wavelength monitor as recited above, wherein the first and second optical fibers are formed upon a substrate comprised of lithium neobate.

The wavelength monitor as recited above, wherein the first and second optical fibers are formed upon a substrate comprised of indium phosphate.

The wavelength monitor as recited above, wherein the first and second optical fibers are configured to facilitate the measurement of a wavelength of optical electromagnetic radiation.

The wavelength monitor as recited above, wherein the first and second optical fibers are configured to facilitate the measurement of a wavelength of infrared electromagnetic radiation.

The wavelength monitor as recited above, further comprising a demultiplexer configured to separate a composite electromagnetic signal into a plurality of separate component electromagnet signals, at least one of the separate electromagnetic signals being communicated to first and second optical fibers configured such that a portion of an electromagnetic signal transmitted through the first optical fiber is separated from a remaining portion of the electromagnetic signal and is communicated to the second optical fiber and is subsequently at least partially recombined with the remaining electromagnetic signal in the first optical fiber after traveling a distance which is different from the distance traveled by the remaining electromagnetic signal in the first optical fiber.

A wavelength monitor comprising: a demultiplexer configured to separate a composite electromagnetic signal into a plurality of separate component electromagnet signals, at least one of the separate electromagnetic signals being communicated to a wavelength monitoring assembly, each wavelength monitoring assembly comprising: first and second optical fibers configured such that a portion of an electromagnetic signal transmitted through the first optical fiber is separated from a remaining portion of the electromagnetic signal and is communicated to the second optical fiber and is subsequently at least partially recombined with the remaining electromagnetic signal in the first optical fiber after traveling a distance which is different from the distance traveled by the remaining electromagnetic signal in the first optical fiber.

An optical receiver system comprising: an input port configured to receive a signal; a tap coupler configured to separate a received signal from the input port into two components thereof; a receiver coupled so as to receive one of the two components; and an optic channel monitor coupled so as to receive another of the two components.

The optical receiver system as recited above, wherein the input port, the tap coupler, the receiver, and the optic channel monitor are formed upon a common substrate so as to define a chip.

The optical receiver system as recited above, wherein the optic channel monitor comprises a fiber based and waveguide type (a non-Mach Zehnder configuration such as that disclosed in U.S. Pat. No. 5,822,049) optic channel monitor.

An optical transmitter system comprising: a transmitter configured so as to provide a transmitted signal; a tap coupler configured to separate the transmitted signal into two components thereof; an optic channel monitor coupled so as to receive one of the two components; and an output port coupled so as to receive another of the two components, the output port being configured so as to facilitate outputting of the other component from the optical transmitter system.

The optical transmitter system as recited above, wherein the transmitter, the tap coupler, the optic channel monitor, and the output port are formed upon a common substrate so as to define a chip.

An optical transceiver system comprising: an input/output port; a WDM coupler configured to separate a received signal from the input/output port into first and second received signal components; a first tap coupler configured to split the first received signal component into third and fourth received signal components; a first optic channel monitor coupled so as to receive the third received signal component so as to facilitate measurement of a power and/or wavelength of the received signal; a receiver coupled so as to receive the fourth received signal component to facilitate demodulation thereof; a transmitter configured to provide a transmitted signal; a second tap coupler configured to spit the transmitted signal into first and second transmitted signal components; wherein the first transmitted signal component is communicated to the input/output port via the WDM coupler; and a second optic channel monitor coupled to receive the second transmitted signal component so as to facilitate measurement of a power and/or wavelength thereof.

The transceiver system as recited above, wherein the first and second optic channel monitors comprise a fiber based and waveguide type (a non-Mach Zehnder configuration such as that disclosed in U.S. Pat. No. 5,822,049) optic channel monitors.

The transceiver system as recited above, wherein the first and second optic channel monitors comprise Mach Zehnder optic channel monitors.

The transceiver system as recited above, wherein: the first tap coupler is configured to spit the first received signal component into 10% third and 90% fourth received signal components; and the second tap coupler is configured to spilt the transmitted signal into 90% first and 10% second transmitted signal components.

The transceiver system as recited above, wherein: the first tap coupler is configured to spit the first received signal component into 1% third and 99% fourth received signal components; and the second tap coupler is configured to spilt the transmitted signal into 99% first and 1% second transmitted signal components.

The transceiver system as recited above, wherein the transmitter comprises a Fabry-Perot laser.

The transceiver system as recited above, wherein the transmitter comprises a distributed feedback (DFB) laser.

The transceiver system as recited above, wherein the receiver comprises a PIN detector.

The transceiver system as recited above, wherein the receiver comprises an APD detector.

The transceiver system as recited above, wherein the receiver comprises a MSM detector.

The transceiver system as recited above, wherein the WDM coupler comprises a WDM coupler selected from the group consisting of: 1310 nm/1550 nm WDM coupler; a 1480 nm/1550 nm WDM coupler; and a 1500 nm/1600 nm WDM coupler.

The transceiver system as recited above, wherein the input/output port, the WDM coupler, the first and second tap couplers, the first and second optic channel monitors, the receiver, and the transmitter are formed upon a common substrate so as to define a chip.

What is claimed is:

1. A device for measuring a wavelength of an electromagnetic signal, the device comprising:

first and second waveguides configured such that a portion of an electromagnetic signal transmitted through the first waveguide is separated from a remaining portion of the electromagnetic signal and is communicated to the second waveguide and is subsequently at least partially recombined with the remaining electromagnetic signal in the first waveguide after traveling a distance which is different from the distance traveled by the remaining electromagnetic signal in the first waveguide;

a first sensor configured to measure a power of the electromagnetic signal in the first waveguide after at least a portion of the separated electromagnetic signal in the second waveguide has been recombined with the remaining electromagnetic signal in the first waveguide;

a second sensor configured to measure a power of the electromagnetic signal in the second waveguide after at least a portion of the separated electromagnetic signal in the second waveguide has been recombined with the remaining electromagnetic signal in the first waveguide;

a log ratio amplifier receiving signals representative of outputs of the first and second sensors and providing an output; and a lookup table for providing a wavelength which corresponds to a value representative of the output of the log ratio amplifier.

2. The device as recited in claim 1, wherein the first and second waveguides are disposed upon a common substrate and wherein the first and second sensors are not disposed on the substrate.

3. The device as recited in claim 1, wherein the first and second waveguides are defined by optical fibers.

4. The device as recited in claim 1, wherein the first and second waveguides are single mode waveguides.

5. The device as recited in claim 1, wherein the first and second waveguides are formed upon a surface of a semiconductor substrate.

6. The device as recited in claim 1, wherein the first and second waveguides are formed upon a surface of a silicon-on-insulator (SOI) substrate.

7. The device as recited in claim 1, wherein the first and second waveguides are formed upon a surface of an indium phosphate substrate.

8. A device for measuring a wavelength of an electromagnetic signal, the device comprising:

a first Mach-Zehnder waveguide pair;

a second Mach-Zehnder waveguide pair receiving a first output of the first Mach-Zehnder waveguide pair;

a third Mach-Zehnder waveguide pair receiving a second output of the first Mach-Zehnder waveguide pair;

a first sensor detecting a first output of the second Mach-Zehnder waveguide pair;

a second sensor detecting a second output of the second Mach-Zehnder waveguide pair;

a third sensor detecting a first output of the third Mach-Zehnder waveguide pair;

a fourth sensor detecting a second output of the third Mach-Zehnder waveguide pair;

a first log ratio amplifier receiving signals representative of outputs of the first and second sensors; and a second log ratio amplifier receiving signals representative of outputs of the third and fourth sensors.

9. The device as recited in claim 8, wherein the first, second and third Mach-Zehnder waveguide pairs are defined by optical fibers.

10. A device for measuring a wavelength of an electromagnetic signal, the device comprising:

a first Mach-Zehnder waveguide pair;

a second Mach-Zehnder waveguide pair, the first and second Mach-Zehnder waveguide pairs having one common waveguide;

a first sensor detecting a first output of the first Mach-Zehnder waveguide pair;

a second sensor detecting a second output of the first Mach-Zehnder waveguide pair and detecting a first output from the second Mach-Zehnder waveguide pair, and a third sensor detecting a second output of the second Mach-Zehnder waveguide pair, a log ratio amplifier receiving signals representative of outputs of the first, second and third sensors.

11. The device as recited in claim 10, wherein the first and second Mach-Zehnder waveguide pairs are defined by optical fibers.

* * * * *